(12) United States Patent
Sasaki et al.

(10) Patent No.: US 9,551,835 B2
(45) Date of Patent: Jan. 24, 2017

(54) GRIN LENS ARRAY, LENS-MOUNTED CONNECTOR, AND LENS-MOUNTED CONNECTOR SYSTEM

(71) Applicant: SUMITOMO ELECTRIC INDUSTRIES, LTD., Osaka-shi, Osaka (JP)

(72) Inventors: Dai Sasaki, Yokohama (JP); Masaki Ohmura, Yokohama (JP); Osamu Shimakawa, Yokohama (JP); Hajime Arao, Yokohama (JP); Yuuichi Mitose, Yokohama (JP); Takuro Watanabe, Yokohama (JP); Motoyoshi Kimura, Komaki (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/933,155

(22) Filed: Nov. 5, 2015

(65) Prior Publication Data
US 2016/0139339 A1    May 19, 2016

(30) Foreign Application Priority Data
Nov. 14, 2014 (JP) ................. 2014-231889

(51) Int. Cl.
G02B 6/32 (2006.01)
G02B 6/38 (2006.01)

(52) U.S. Cl.
CPC ............... *G02B 6/32* (2013.01); *G02B 6/3825* (2013.01); *G02B 6/3853* (2013.01); *G02B 6/3885* (2013.01); *G02B 6/3851* (2013.01); *G02B 6/3882* (2013.01)

(58) Field of Classification Search
CPC ....... G02B 6/32; G02B 6/3825; G02B 6/3851; G02B 6/3853; G02B 6/3882; G02B 6/3885
USPC .................................. 385/33, 34, 78
See application file for complete search history.

(56) References Cited

U.S. PATENT DOCUMENTS

| 5,832,153 | A | 11/1998 | Duck |
| 2002/0041732 | A1 | 4/2002 | Zhu |
| 2004/0175073 | A1 | 9/2004 | Grinderslev et al. |
| 2014/0064667 | A1* | 3/2014 | Isenhour .............. G02B 6/3893 385/76 |
| 2014/0143996 | A1 | 5/2014 | Bhagavatula et al. |

FOREIGN PATENT DOCUMENTS

| GB | 2245987 | 1/1992 |
| JP | H07-261056 A | 10/1995 |

(Continued)

*Primary Examiner* — Ryan Lepisto
(74) *Attorney, Agent, or Firm* — Drinker Biddle & Reath LLP

(57) ABSTRACT

A GRIN lens array of an embodiment has a structure for enabling a coupling face in which lens end faces of GRIN lenses are arranged, to be accurately polished so as to have a desired angle relative to optical axes of the GRIN lenses. The GRIN lens array has the GRIN lenses and a main body portion. The main body portion comprises a holding portion having a coupling face, and an edge portion having a reference face to be used as a reference in polishing of the coupling face. The respective thicknesses of the holding portion and the edge portion along the longitudinal direction of the GRIN lenses are set so as to form a step between the coupling face and the reference face.

16 Claims, 13 Drawing Sheets

(56) References Cited

FOREIGN PATENT DOCUMENTS

| | | |
|---|---|---|
| JP | 3259746 B2 | 2/2002 |
| JP | 2005-300596 A | 10/2005 |
| JP | 2013-101312 | 5/2013 |
| WO | WO 2013/086117 | 6/2013 |
| WO | WO 2014/035853 | 3/2014 |

* cited by examiner

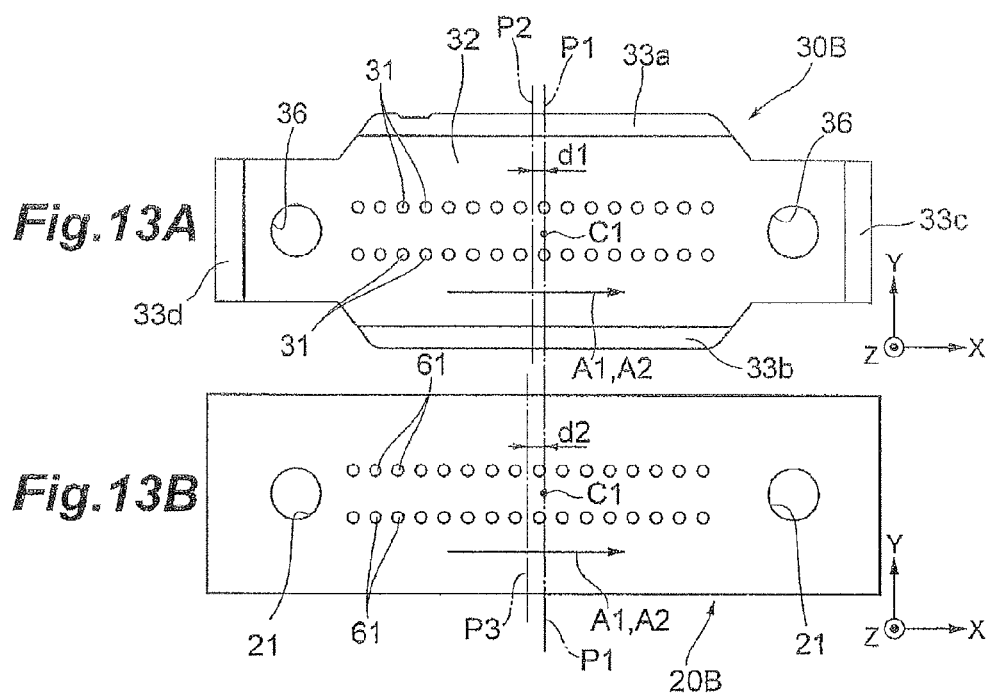

GRIN LENS ARRAY, LENS-MOUNTED CONNECTOR, AND LENS-MOUNTED CONNECTOR SYSTEM

TECHNICAL FIELD

The present invention relates to a GRIN (Graded-Index) lens array, a lens-mounted connector, and a lens-mounted connector system.

BACKGROUND

Japanese Patent Application Laid-open Publication No. 2005-300596 (Patent Literature 1) describes a problem about the optical connector for connection between single mode fibers (each of which will be referred to hereinafter as "SMF") that it is easily subjected to reduction in coupling efficiency due to misalignment of fiber axes for the reason of small core diameter. Furthermore, this Patent Literature 1 discloses a composite optical fiber for solving the foregoing problem. The composite optical fiber is configured by connecting a plurality of optical fibers of different core diameters in an increasing order of the core diameters. During passage of a beam through the composite optical fiber of this configuration, the beam diameter gradually increases with increase in core diameter. The beam diameter becomes maximum at a point of transfer of the beam between optical connectors. It is intended by this scheme that the reduction in coupling efficiency is suppressed even with occurrence of the misalignment between SMFs.

Japanese Patent No. 3259746 (Patent Literature 2) discloses an optical fiber array unit. This optical fiber array unit is composed of a plurality of subunits stacked. Each subunit has a first member which holds a plurality of SMFs in a state in which they are arranged in parallel to each other, a second member which holds graded-index optical fibers (each of which will be referred to hereinafter as "GRIN optical fiber") for collimating beams output from the respective SMFs into parallel beams, and positioning means which positions the first member and the second member so as to coaxially connect the SMFs and GRIN optical fibers to each other.

SUMMARY

The Inventors conducted detailed research on the conventional technologies and found the problem as described below. For example, Patent Literature 2 above describes the structure in which the GRIN lenses (GRIN optical fibers) are coupled to the tips of the optical fibers, in the optical connector for connection between optical fibers.

A GRIN lens is a gradient index lens wherein a refractive index profile thereof is adjusted by an ion-exchange process of a lens-constituting medium so as to bend and condense diffusive light. Namely, the GRIN lens can have the refractive index profile that can be adjusted by a processing method of ion exchange. The GRIN lens available can be, for example, a Selfoc lens ("Selfoc" is a registered trademark).

With use of such optical connectors, the transfer of beam between the optical connectors can be implemented in an expanded state of the beam diameter, so as to increase a tolerable range of the misalignment between the optical connectors. However, in the case where the member holding the optical fibers and the member holding the GRIN lenses are separately configured as in the configuration described in the foregoing Patent Literature 2, the size of the member (particularly, the thickness along the optical-axis direction) holding the GRIN lenses tends to become small. Therefore, there is a problem that it is difficult to accurately polish the front end face of the member (the face in contact with the counterpart optical connector) so as to have a desired angle with respect to the optical axes of the GRIN lenses. If an error is made in the angle of the front end face of the member, the direction of incidence/emergence of light becomes inclined relative to the optical axes of the counterpart optical connector, resulting in connection loss.

The present invention has been accomplished in order to solve the problem as described above, and it is an object of the present invention to provide a GRIN lens array, a lens-mounted connector, and a lens-mounted connector system with a structure for enabling the front end face of the member holding the GRIN lenses to be accurately polished at a desired angle relative to the optical axes of the GRIN lenses.

In order to solve the above problem, a GRIN lens array according to an embodiment of the invention comprises: a plurality of GRIN lenses each of which has a first lens end face and a second lens end face opposed to the first lens end face; and a main body portion which holds these GRIN lenses in a state in which the first and second lens end faces of each of the GRIN lenses are arranged along a first direction. The main body portion comprises a holding portion integrally holding the plurality of GRIN lenses, and an edge portion provided on a side face of the holding portion. The holding portion has a first coupling face in which the first lens end faces of the GRIN lenses are arranged, and a second coupling face which is opposed to the first coupling face and in which the second lens end faces of the GRIN lenses are arranged. The side face of the holding portion is defined as a face lying between the first and second coupling faces. The edge portion has a first reference face located on the side where the first lens end faces of the GRIN lenses are arranged, and a second reference face opposed to the first reference face and located on the side where the second lens end faces of the GRIN lenses are arranged. Particularly, in the GRIN lens array, a distance between the first and second coupling faces along the first direction is set larger than a distance between the first and second reference faces along the first direction, whereby a step is made at least between the first coupling face and the first reference face. The second coupling face of the holding portion and the second reference face of the edge portion may be arranged on an identical plane. In this case, the first reference face functions as a common reference face on the occasion of polishing both of the first and second coupling faces.

BRIEF DESCRIPTION OF THE DRAWINGS

FIG. 13A is a front view obtained by viewing a first face of a GRIN lens array according to the second modification example from its front, and FIG. 13B is a front view obtained by viewing a front end face of a ferrule in the second modification example from its front.

DETAILED DESCRIPTION

[Description of Embodiment of Present Invention]

Figure 1:
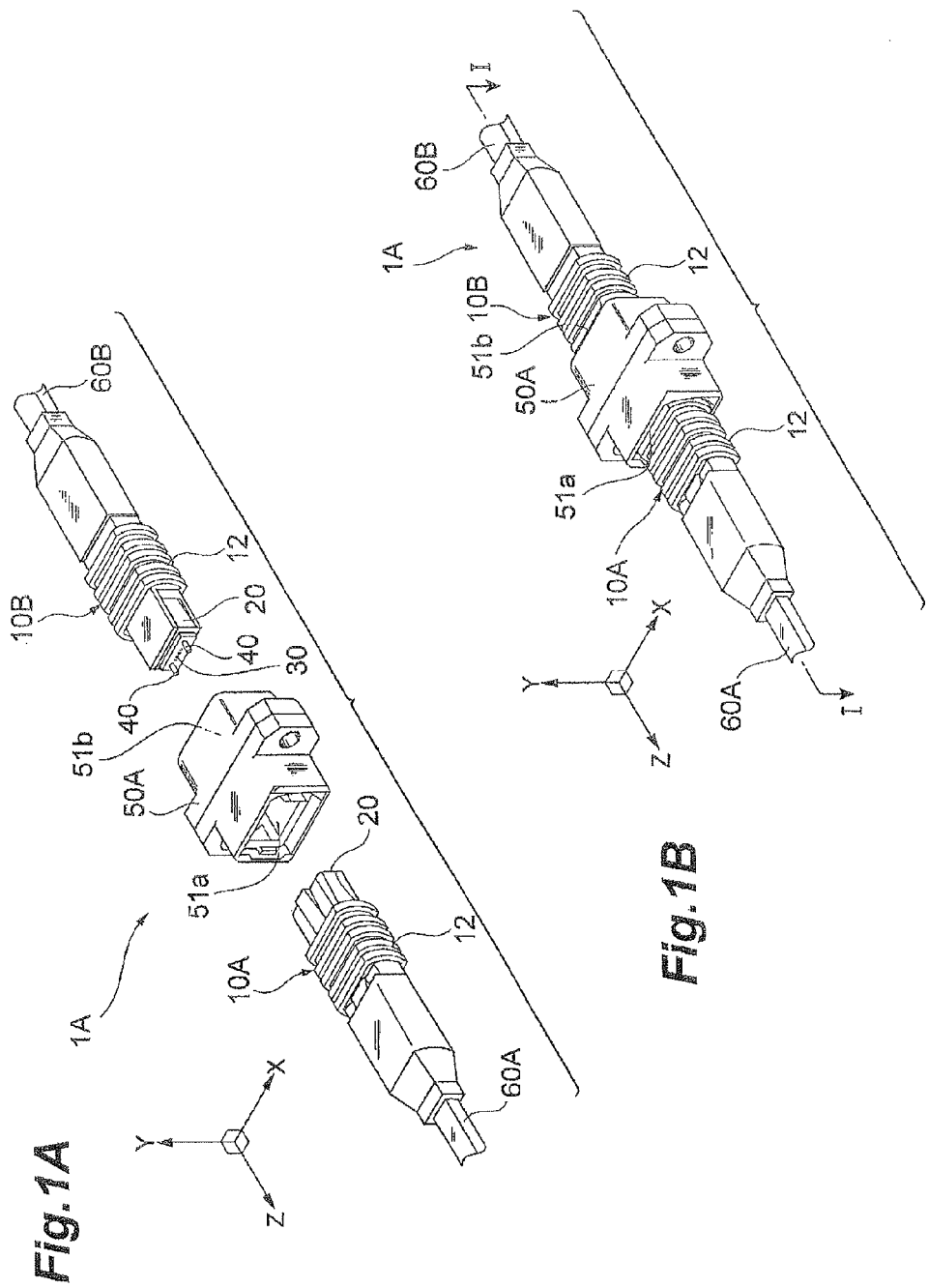
FIG. 1A and FIG. 1B are perspective views showing a lens-mounted connector system according to the first embodiment of the present invention.

First, the contents of the embodiment of the present invention will be described as enumerated below.

As one aspect of the embodiment of the invention, a GRIN lens array comprises: a plurality of GRIN lenses each of which has a first lens end face and a second lens end face opposed to the first lens end face; and a main body portion which holds the plurality of GRIN lenses in a state in which the first and second lens end faces of each of the GRIN lenses are arranged along a first direction. The main body portion comprises a holding portion integrally holding the plurality of GRIN lenses, and an edge portion provided on a side face of the holding portion. The holding portion has a first coupling face in which the first lens end faces of the GRIN lenses are arranged, and a second coupling face which is opposed to the first coupling face and in which the second lens end faces of the GRIN lenses are arranged. The side face of the holding portion is defined as a face lying between the first and second coupling faces. The edge portion has a first reference face located on the side where the first lens end faces of the GRIN lenses are arranged, and a second reference face opposed to the first reference face and located on the side where the second lens end faces of the GRIN lenses are arranged. In the description hereinbelow, the first coupling face of the holding portion will be referred to as "first face," the first reference face of the edge portion as "second face," the second coupling face of the holding portion as "third face," and the second reference face of the edge portion as "fourth face." Each GRIN lens has a shape elongated along a predetermined direction connecting the first lens end face and the second lens end face, and even if the distance between the first and second lens end faces is small (e.g., even if the distance is not more than a maximum diameter of the lens end face), the predetermined direction connecting the first lens end face and the second lens end face shall be defined as a longitudinal direction (first direction) of the GRIN lens in the present specification.

Namely, the GRIN lens array having the above-described structure comprises the plurality of GRIN lenses to be optically connected to a first connection target component, and the main body portion, and comprises at least the first face and the second face. The main body portion has a first end portion and a second end portion arranged at respective different positions along the first direction, and the first face and the second face both constitute the first end portion or the end portion on the side facing the first connection target component. The first face includes a first guide portion which defines an orientation of the GRIN lens array so that the plurality of GRIN lenses are connected to the first connection target component along the first direction (the direction in which the plurality of GRIN lenses are arranged as described above and which coincides with the longitudinal direction of each lens), and a first interface region which extends along a first plane intersecting with the first direction and in which the first lens end face of at least one GRIN lens is exposed. In this case, the GRIN lens with the first lens end face thereof being exposed in the first interface region is kept in a state in which it is optically connected to the first connection target component. Furthermore, the first guide portion defines the position of the first interface region on the first plane intersecting with the first direction. The second face is substantially parallel to the first face and is formed at positions different from those of the first face in the first direction and in a second direction intersecting with the first direction. In other words, the second face is approximately parallel to the first face and is arranged at the position where the shortest distance from the second end portion to the second face along the first direction is smaller than the shortest distance from the second end portion to the first face along the first direction and at the position which is different from that of the first face along the second direction intersecting with the first direction. A step portion is formed in the first end portion of the main body portion by the first and second faces arranged in this manner.

With the GRIN lens array of the above aspect, it becomes feasible to polish the first interface region (region included in the front end face corresponding to the first coupling face of the holding portion), using the second face as a reference face. Therefore, as long as the second face is formed so as to have a desired angle with respect to the first direction or connection direction (coincident with the longitudinal direction of each GRIN lens), the first interface region can be accurately formed with the desired angle, by polishing the first face in parallel to the second face. On that occasion, the second face does not impede the polishing operation because it is formed at the positions different from those of the first face in the first direction and in the direction intersecting with the first direction. Namely, with the GRIN lens array as described above, we have succeeded in providing the GRIN lens array in which the angular error of the first interface region is suppressed, which has low connection loss to the first connection target component (e.g., a counterpart optical connector) and thus has good optical characteristics, and which is applied to a lens-mounted connector.

As one aspect of the embodiment, the GRIN lens array may further comprise the third face opposed to the first face and the fourth face opposed to the second face. In this case, both of the third face and the fourth face constitute the second end portion or the end portion on the side opposite to the first end portion of the main body portion. The third face includes a second guide portion which defines an orientation of the GRIN lens array so that the plurality of GRIN lenses are connected along the first direction to a second connection target component different from the first connection target component; and a second interface region which extends along a second plane intersecting with the first direction and in which the second lens end face of at least one GRIN lens is exposed. In this case, the GRIN lens with the second lens end face thereof being exposed in the second interface region is kept in a state in which it is optically connected to the second connection target component. Furthermore, the second guide portion defines the position of the second interface region on the second plane intersecting with the first direction. The fourth face may be substantially parallel to the third face and may be formed at positions different from those of the third face in the first direction and in a third direction intersecting with the first direction. Therefore, in the GRIN lens array, the distance between the first and third faces along the first direction (the distance between the first and second coupling faces in the holding portion) is set larger than the distance between the second and fourth faces along the first direction (the distance between the first and second reference faces in the edge portion).

When the size of the member holding each GRIN lens (particularly, the thickness in the optical-axis direction coincident with the first direction) is small, it is also difficult to accurately polish the third face of the GRIN lens array (the rear end face corresponding to the second coupling face of the holding portion) opposed to the second connection target component (e.g., a member holding optical fibers) so as to have a desired angle relative to the optical axes of the GRIN lenses. If the third face has an angular error, the optical axes of the GRIN lens array and the optical axes of the second connection target component will become inclined relative to each other, raising a possibility of occurrence of connection loss. In contrast to it, the above-described GRIN lens array allows the third face to be polished using the fourth face as a reference face. Therefore, as long as the fourth face is formed so as to have the desired angle with respect to the first direction or connection direction, the second interface region can be accurately formed with the desired angle, by polishing the third face so as to become parallel to the fourth face. On that occasion, the polishing operation of the third face is not impeded by the fourth face because the fourth face is formed at the positions different from those of the third face in the first direction and in the direction intersecting with the first direction. Namely, the GRIN lens array can be made while well suppressing the angular error of the second interface region and thus further reducing the optical loss. For example, even in a situation where the third face and the first face are not parallel to each other, the first and second interface regions both can be accurately formed.

As one aspect of the present embodiment, the GRIN lens array may further comprise the third face opposed to the first face. The third face includes: a second guide portion which defines an orientation of the GRIN lens array so that the plurality of GRIN lenses are connected along the first direction to a second connection target component different from the first connection target component; and a second interface region in which the other end face of at least one GRIN lens is exposed and which is optically connected to the second connection target component. The first face, second face, and third face may be substantially parallel to each other. The third face in this aspect includes a face corresponding to the second reference face of the edge portion and, therefore, the third face in this aspect has a structure equivalent to a structure in which the second coupling face of the holding portion and the second reference face of the edge portion are arranged on an identical plane. According to this configuration, in the GRIN lens array the distance between the first and third faces along the first direction (distance between the first and second coupling faces in the holding portion) is set larger than the distance between the second and fourth faces along the first direction (distance between the first and second reference faces in the edge portion).

In the above-described configuration (wherein the third face and fourth face are arranged on the identical plane), if the third face has an angular error, the optical axes of the GRIN lens array and the optical axes of the second connection target component will become inclined relative to each other, raising a possibility of occurrence of connection loss. In contrast to it, the foregoing GRIN lens array allows the third face to be polished using the second face as a reference face. Therefore, the second interface region can be accurately formed with the desired angle, by polishing the third face so as to become parallel to the second face. Namely, the foregoing GRIN lens array is made while well suppressing the angular error of the second interface region and thus further reducing the optical loss. Since the first face and third face can be polished in the same direction (direction along the second face), the manufacture of the GRIN lens array can be facilitated.

As one aspect of the embodiment, the first guide portion and the second guide portion may be comprised of a common through hole penetrating in the first direction between the first face and the third face. Namely, the first guide portion includes one opening end of the common through hole penetrating along the first direction between the first face and the third face, and the second guide portion includes the other opening end of the common through hole. This configuration allows the first connection target component, GRIN lens array, and second connection target component to be connected in the first direction with use of a common guide pin, so as to facilitate improvement in positioning accuracy.

As one aspect of the embodiment, the GRIN lens array may further comprise a side face which connects the first face and the third face along the first direction. At least one indentation indented in a fourth direction intersecting with the first direction may be formed in the side face. For example, when the main body portion of the GRIN lens array is formed by injection molding of a resin, a mold is provided with a gate for injection of the resin. After completion of molding, a burr remains at the position of the gate and this burr may impede the polishing operation. For this reason, it is necessary to perform a step of removing the burr. In contrast to it, the foregoing GRIN lens array allows the gate of the mold to be located, for example, at the indentation in the side face, whereby the polishing operation is less likely to be impeded by the burr, thus eliminating the need for the step of removing the burr. Therefore, this GRIN lens array achieves decrease of manufacturing step and thus enables reduction in manufacturing cost.

As one aspect of the embodiment, two or more indentations may be formed in the side face. When the main body portion of the GRIN lens array is formed by injection molding of a resin, the main body potion needs to be pushed out, in order to take the main body portion out of the mold after the injection molding. At this time, the main body portion is pushed out using a member called an ejector pin, and a mark of the pin can be left at a portion of the GRIN lens array in contact with the ejector pin. Therefore, it becomes necessary to perform a step of removing the mark. In contrast to it, the foregoing GRIN lens array allows the contact portion with the ejector pin to be located, for example, at the second indentation in the side face, whereby the step of removing the mark becomes unnecessary. Therefore, this GRIN lens array achieves further decrease of manufacturing step and thus enables further reduction in manufacturing cost.

As one aspect of the embodiment, a lens-mounted connector may comprise the aforementioned GRIN lens array, and, a ferrule and a plurality of optical fibers as a second connection target component. Namely, the lens-mounted connector comprises: the GRIN lens array as set forth; and a connection component including the plurality of optical fibers optically connected in a one-to-one relation to the respective GRIN lenses and the ferrule holding tip portions of the optical fibers. The ferrule has: a third guide portion connected to the second guide portion; a ferrule end face substantially parallel to the third face; and a plurality of fiber holding holes. The plurality of fiber holding holes correspond to the respective GRIN lenses and extend along a direction perpendicular to the ferrule end face (or along the first direction) from the ferrule end face. The plurality of optical fibers are held in the respective fiber holding holes while the tips (the fiber end faces) of the respective optical fibers are exposed in the ferrule end face. The ferrule is fixed to the GRIN lens array in a state in which the ferrule end face and the third face are opposed. In this lens-mounted connector, the foregoing GRIN lens array and ferrule can be accurately fixed in a predetermined positional relationship. Therefore, the lens-mounted connector is provided as one with good optical characteristics.

As one aspect of the embodiment, in a configuration wherein the second connection target component holds a plurality of optical fibers to be optically coupled to the respective GRIN lenses, positions of respective optical axes of the plurality of GRIN lenses in the first face may be deviated in a direction along the first plane (a predetermined deviation direction), with respect to optical axes of the respective optical fibers. Since this configuration makes the optical axes of light incident into the first interface region or emerging from the first interface region, inclined relative to the first direction, it is feasible to avoid coupling of reflected light to each optical fiber of the second connection target component. Therefore, it becomes feasible to provide the GRIN lens array applied to the lens-mounted connector with good optical characteristics.

As one aspect of the embodiment, in a configuration wherein the first face includes a pair of first guide portions and wherein the first interface region is arranged between the pair of first guide portions, a center position of a lens group consisting of the plurality of GRIN lenses (a center position of the first interface region) may be deviated in a direction opposite to the deviation direction of the optical axes of the respective GRIN lenses from a center position between the pair of first guide portions. This configuration allows the two GRIN lens arrays with the same configuration to be suitably connected to each other through the optical axes inclined relative to the first direction.

As one aspect of the embodiment, a lens-mounted connector system comprises first and second lens-mounted connectors each having the same structure as the aforementioned lens-mounted connector; an adaptor holding the first and second lens-mounted connectors; and a connection member which positions the first and second lens-mounted connectors relative to each other. The adaptor holds the first and second lens-mounted connectors in a state in which the first faces of the respective connectors are opposed to each other. The connection member connects the adaptor to each of the first guide portions of the first and second lens-mounted connectors, whereby the first and second lens-mounted connectors are positioned relative to each other so as to optically couple the first interface regions thereof to each other. In this lens-mounted connector system, optical connection between the first interface regions can be implemented in an expanded state of the diameter of beams. Therefore, guide pins are not required to have high processing accuracy and the lens-mounted connector system with good optical characteristics can be provided at low cost.

It is noted that each of the aspects enumerated above in this section of [Description of Embodiment of Present Invention] is applicable to each of all the rest aspects or to all combinations of these rest aspects.

[Details of Embodiment of Present Invention]

Specific examples of the GRIN lens array, lens-mounted connector, and lens-mounted connector system according to the embodiment of the present invention will be described below with reference to the drawings. It should be noted that the present invention is by no means intended to be limited to these examples presented by way of illustration only and that the present invention is intended for inclusion of all changes and modifications as described in the scope of claims and falling within the meaning and scope of equivalency to the scope of claims. In the description hereinbelow, the same elements will be denoted by the same reference signs in the description of the drawings, without redundant description. In each drawing, the XYZ orthogonal coordinate system is shown as occasion demands.

FIG. 1A and FIG. 1B are perspective views showing a lens-mounted connector system 1A according to the first embodiment of the present invention. The lens-mounted connector system 1A has a first lens-mounted connector 10A, a second lens-mounted connector 10B, and an adaptor 50A. FIG. 1A shows a state before the lens-mounted connectors 10A, 10B are brought into connection, and FIG. 1B a state in which the lens-mounted connectors 10A, 10B have been connected to each other. The lens-mounted connector 10A is attached to a terminal end of an optical cable (optical fiber ribbon) 60A, and the lens-mounted connector 10B to a terminal end of another optical cable (optical fiber ribbon) 60B. The lens-mounted connectors 10A, 10B have the same configuration. The lens-mounted connector 10B is an example of the first connection target component for the lens-mounted connector 10A, and the lens-mounted connector 10A is an example of the first connection target component for the lens-mounted connector 10B.

The adaptor 50A is a member that holds the lens-mounted connectors 10A, 10B in a state in which front end faces thereof are opposed to each other, and has an inlet 51a into which the lens-mounted connector 10A is to be introduced, and an inlet 51b into which the lens-mounted connector 10B is to be introduced. The inlets 51a, 51b communicate with each other in the Z-direction (first direction). The lens-mounted connector 10A put in the inlet 51a and the lens-mounted connector 108 put in the inlet 51b are connected to each other along the Z-direction inside the adaptor 50A. This connection results in optically coupling a plurality of optical fibers included in the optical cable 60A and a plurality of optical fibers included in the optical cable 60B, to each other.

Each of the lens-mounted connectors 10A, 10B has a ferrule 20 and a GRIN lens array 30. The ferrule 20 is an example of the second connection target component and holds a plurality of optical fibers. Tips of these optical fibers (fiber end faces) are exposed in a front end face of the ferrule 20 (ferrule end face). The GRIN lens array 30 is fixed to the front end face of the ferrule 20 by adhesion, while exposed at the front end of the lens-mounted connector 10A or 10B. The GRIN lens array 30 has a plurality of GRIN lenses optically coupled to the respective optical fibers. For example, the GRIN lens array 30 provided in one lens-mounted connector 10A expands the diameter of each of beams output from the plurality of optical fibers included in the optical cable 60A. At this time, the GRIN lens array 30 provided in the other lens-mounted connector 10B receives the expanded beams from the one lens-mounted connector 10A, condenses these beams, and guides the condensed beams into the corresponding optical fibers included in the optical cable 60B. Configurations of the ferrule 20 and GRIN lens array 30 will be described below in detail.

Figure 2:
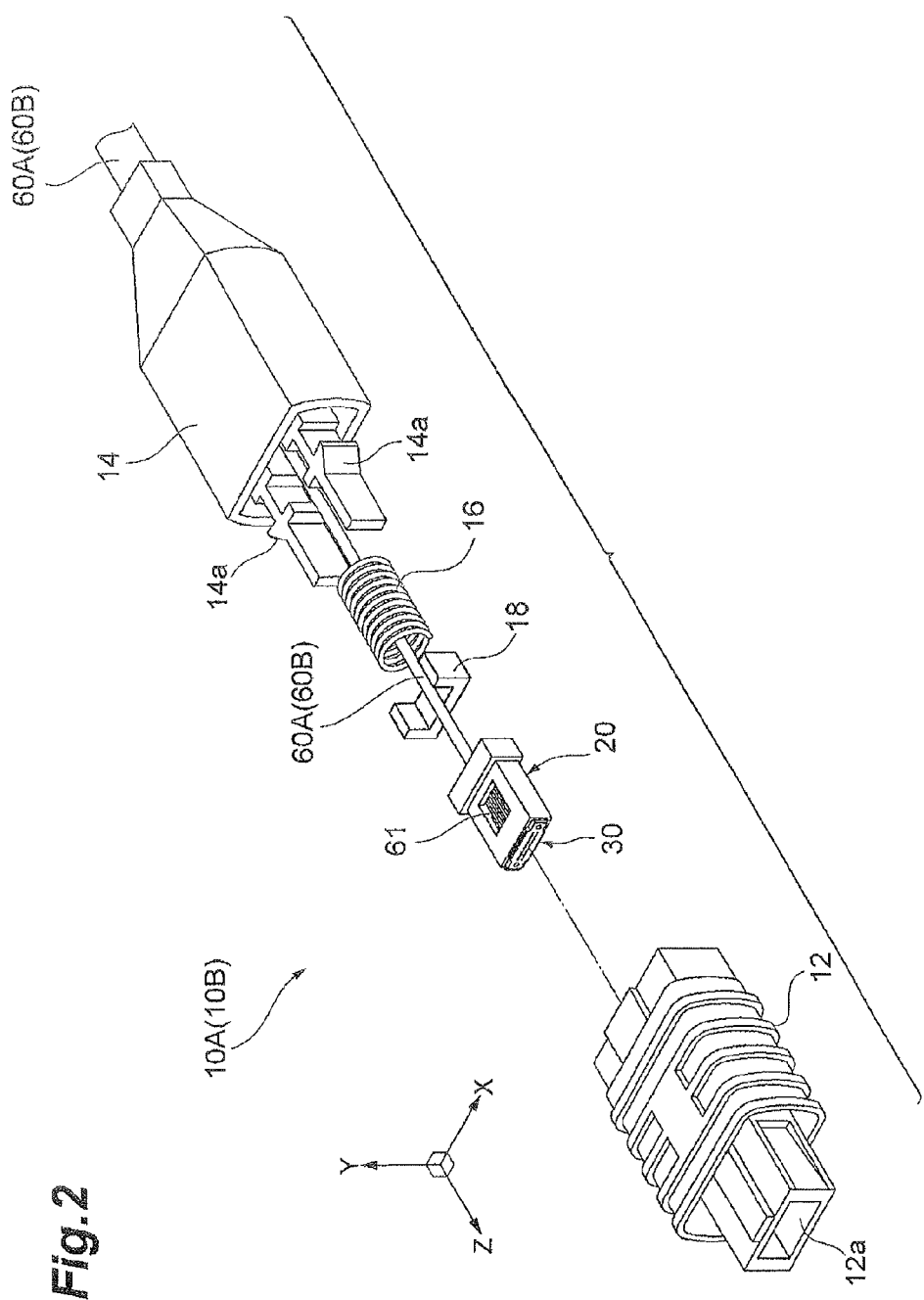
FIG. 2 is an exploded perspective view showing an internal configuration of a lens-mounted connector.

FIG. 2 is an exploded perspective view showing an internal configuration of the lens-mounted connector 10A or 10B. As shown in FIG. 2, the lens-mounted connector 10A, 10B further has a housing 12, a boot 14, a helical compression spring 16, and a spacer 18, in addition to the aforementioned ferrule 20 and GRIN lens array 30.

The housing 12 is a member that covers the helical compression spring 16, spacer 18, and ferrule 20 and that is composed of a tubular body with a cross-sectional shape along the X-Y plane being a rectangular shape. The housing 12 has an opening 12a at its front end and, the front end portion of the ferrule 20 and the GRIN lens array 30 are exposed from this opening 12a.

The boot 14 is attached to a rear end portion of the housing 12 and covers the optical cable 60A (60B). The boot 14 is comprised of a resin material with moderate flexibility and prevents the optical cable 60A (60B) from being bent excessively. The boot 14 has a pair of latch mechanisms 14a and this pair of latch mechanisms 14a is brought into engagement with an opening at the rear end side of the housing 12, whereby the boot 14 and the housing 12 become coupled to each other. The helical compression spring 16 is disposed between the boot 14 and the rear end of the ferrule 20 to impose a forward biasing force on the ferrule 20. Since this configuration causes the ferrules 20 to come into contact with each other while pushing each other in a state in which the lens-mounted connectors 10A, 10B are connected to each other, the optical fibers can be optically coupled stably to each other. The spacer 18 is interposed between the helical compression spring 16 and the rear end of the ferrule 20 to adjust the Z-directional position of the rear end of the ferrule 20 by the width thereof.

Figure 3:
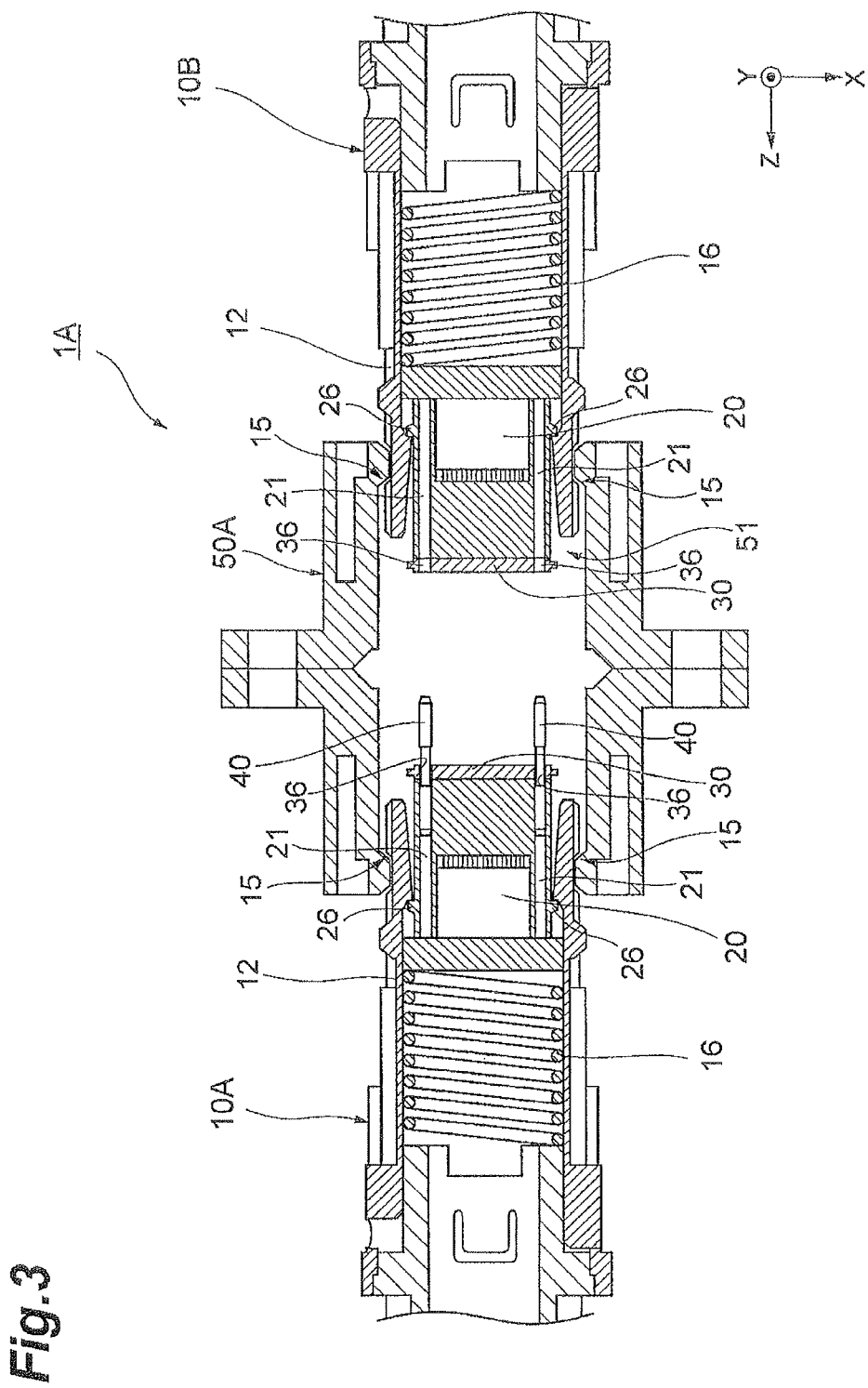
FIG. 3 is a cross-sectional view showing an internal structure of the lens-mounted connector system shown in FIG. 1B, which is obtained by cutting the lens-mounted connector system along the X-Z plane including the line I-I.

FIG. 3 is a cross-sectional view showing the internal structure of the lens-mounted connector system 1A shown in FIG. 1B, which is obtained by cutting the system along the X-Z plane including the line I-I. FIG. 3 is depicted without illustration of the optical cable 60A (60B) and optical fibers shown in FIGS. 1A, 1B, and 2.

As shown in FIG. 3, a predetermined gap (clearance) is provided between the ferrule 20 and the inner wall of the housing 12. Furthermore, projections 26 are provided on a pair of side faces of the ferrule 20. These projections come into engagement with the inner wall of the housing 12, whereby the biasing force of the helical compression spring 16 is received by the housing 12. In that state, the front end of the ferrule 20 projects forward farther than the front end of the housing 12. This configuration allows the front ends of the ferrules 20 to be readily made opposed in the adaptor 50A and to be connected to each other by means of guide pins 40 described below.

In each of the lens-mounted connectors 10A, 10B, a pair of guide pin holes 36 extending in the Z-direction are formed in the GRIN lens array 30. These guide pin holes 36 are arranged in juxtaposition in the X-direction. Furthermore, a pair of guide pin holes 21 extending in the Z-direction are formed in the ferrule 20. These guide pin holes 21 are arranged in juxtaposition in the X-direction and communicate with the corresponding guide pin holes 36.

Portions on the front end side of the guide pin holes 36 constitute the first guide portion in the present embodiment. Namely, the guide pins 40 are inserted into the front-end-side portions of the guide pin holes 36, whereby an orientation of the GRIN lens array 30 is defined so that the GRIN lenses of the GRIN lens array 30 are connected along the Z-direction to the corresponding GRIN lenses of the connection counterpart. The rear-end-side portions of the guide pin holes 36 and the guide pin holes 21 constitute the second and third guide portions, respectively, in the present embodiment. Namely, when the GRIN lens array 30 is attached to the ferrule 20 in a manufacturing process of the lens-mounted connector 10A, 10B, jig guide pins (described later) are put into the rear-end-side portions of the guide pin holes 36 and the guide pin holes 21. This operation results in defining the orientation of the GRIN lens array 30 so as to connect the GRIN lenses of the GRIN lens array 30 to the optical fibers of the ferrule 20 along the Z-direction.

When the lens-mounted connectors 10A, 10B are brought into connection to each other, the guide pins 40 are inserted into the guide pin holes 36, 21 of one lens-mounted connector 10A. The inserted guide pins 40 are then inserted into the guide pin holes 36, 21 of the other lens-mounted connector 10B inside the adaptor 50A. This operation causes the guide pin holes 36 of the lens-mounted connector 10A to be connected to the guide pin holes 36 of the lens-mounted connector 10B, whereby the lens-mounted connectors 10A, 10B become positioned relative to each other, Latch mechanisms 15 are provided on the inner surface of the adaptor 50A and the outer periphery of the housing 12. When the lens-mounted connectors 10A, 10B are pushed into the adaptor 50A, the two GRIN lens arrays 30 thereof come into contact with each other. Then, the lens-mounted connectors 10A, 10B are further pushed to compress the helical compression springs and in this state the latch mechanisms 15 come to act (while the inner surface of the adaptor 50A comes into engagement with the outer peripheries of the housings 12). Through this action, the GRIN lens arrays 30 are brought in contact with each other with loads being applied in the connection direction (Z-direction) and, as a result, a stable optical connection state is achieved.

Figure 4:
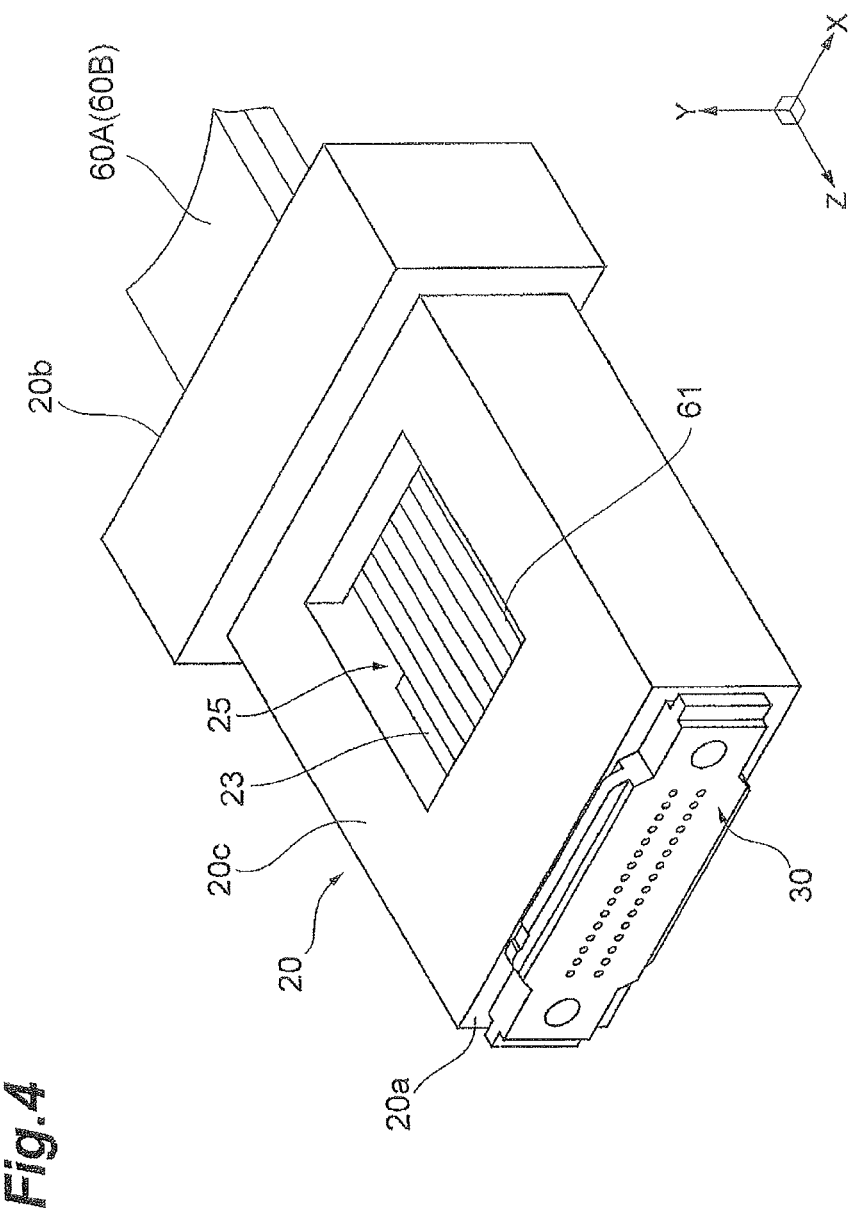
FIG. 4 is a perspective view showing a ferrule, a GRIN lens array, an optical cable, and optical fibers.
Figure 5:
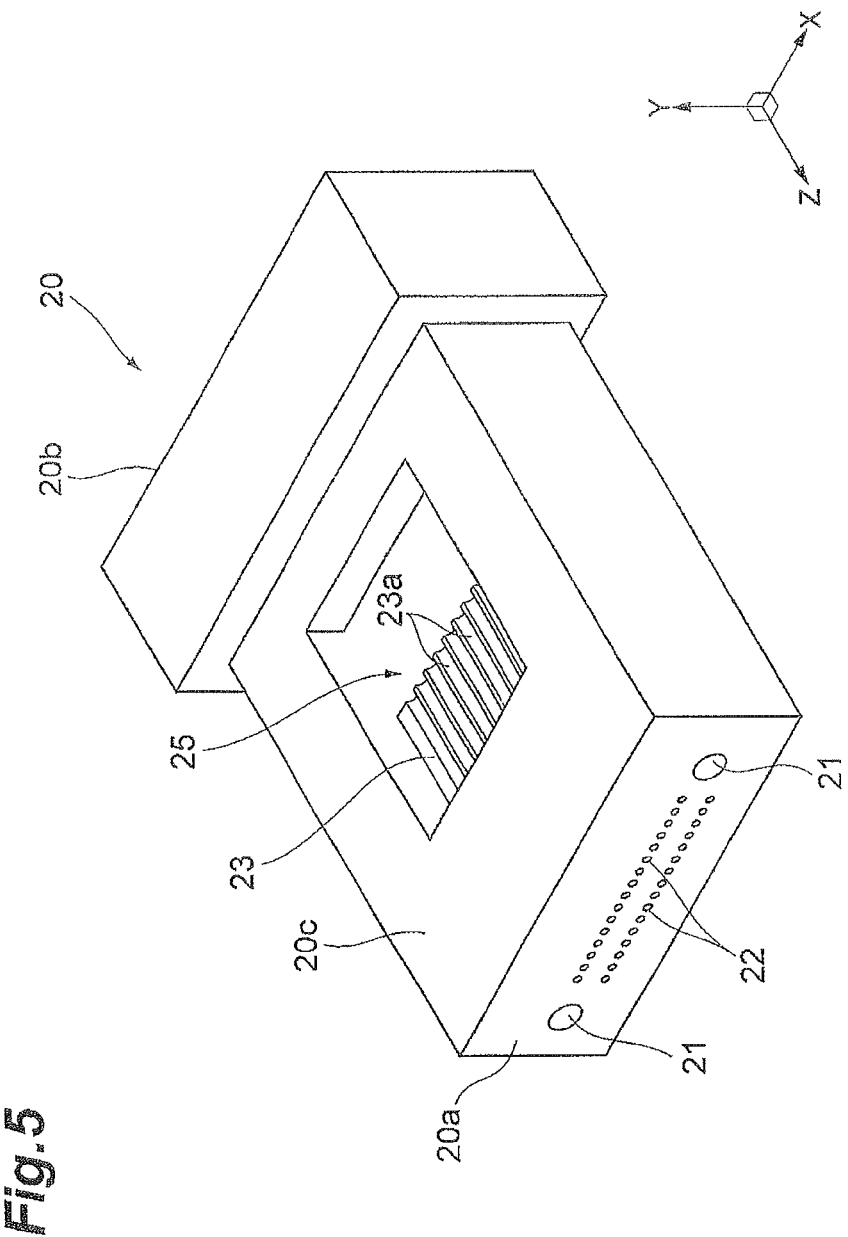
FIG. 5 is a perspective view showing a form obtained by excluding the GRIN lens array, optical cable, and optical fibers from the configuration shown in FIG. 4.

FIG. 4 is a perspective view showing the ferrule 20, GRIN lens array 30, optical cable 60A (60B), and optical fibers 61. FIG. 5 is a perspective view showing a form obtained by excluding the GRIN lens array 30, optical cable 60A (60B), and optical fibers 61 from FIG. 4.

As shown in FIG. 4, the ferrule 20 collectively holds a plurality of optical fibers 61 led out from the optical cable 60A (60B). For that purpose, the ferrule 20 has an aperture for the optical cable 60A (60B) to be introduced thereinto, in its rear end face 20b and further has a plurality of fiber holding holes 22 (cf. FIG. 5) for holding the respective optical fibers 61, in its front end face 20a. The plurality of fiber holding holes 22 extend each along the Z-direction and are arranged in juxtaposition in the X-direction and in the Y-direction. In the example shown in FIG. 5, the fiber holding holes 22 are constituted of two Y-directionally-juxtaposed rows each of which consists of eighteen X-directionally-arranged holding holes (i.e., 36 holes in total). Each fiber holding hole 22 includes a coating holding portion having the inner diameter corresponding to the diameter of a coating portion of the optical fiber 61, and a bare fiber holding portion having the smaller inner diameter than the coating holding portion and holding a bare fiber in the optical fiber 61 after removal of its coating. The bare fiber holding portion opens in the front end face 20a of the ferrule 20.

An opening 25 is formed in one side face 20c which connects the front end face 20a and rear end face 20b of the ferrule 20. This opening 25 is an opening through which an adhesive for fixing the optical fibers 61 to the ferrule 20 is introduced. An optical fiber supporting portion 23 is provided in the opening 25 and a plurality of grooves 23a (cf. FIG. 5) each extending from the rear ends of the corresponding fiber holding holes 22 are formed in the optical fiber supporting portion 23. Each optical fiber 61 is set in the corresponding groove 23a. The ferrule 20 is formed, for example, by injection molding of a resin.

Inside the optical cable 60, the plurality of optical fibers 61 are integrated by a coating resin. The coating resin is partly removed from the vicinity of the tips of these optical fibers 61, so as to separate the optical fibers 61 into single fibers. In this state, the coating portion of each optical fiber 61 is held by the coating holding portion of the fiber holding hole 22 and the bare fiber is held by the bare fiber holding portion (cf. FIG. 4). The tips of the bare fibers of the respective optical fibers 61 are exposed in the front end face 20a of the ferrule 20.

Figure 6:
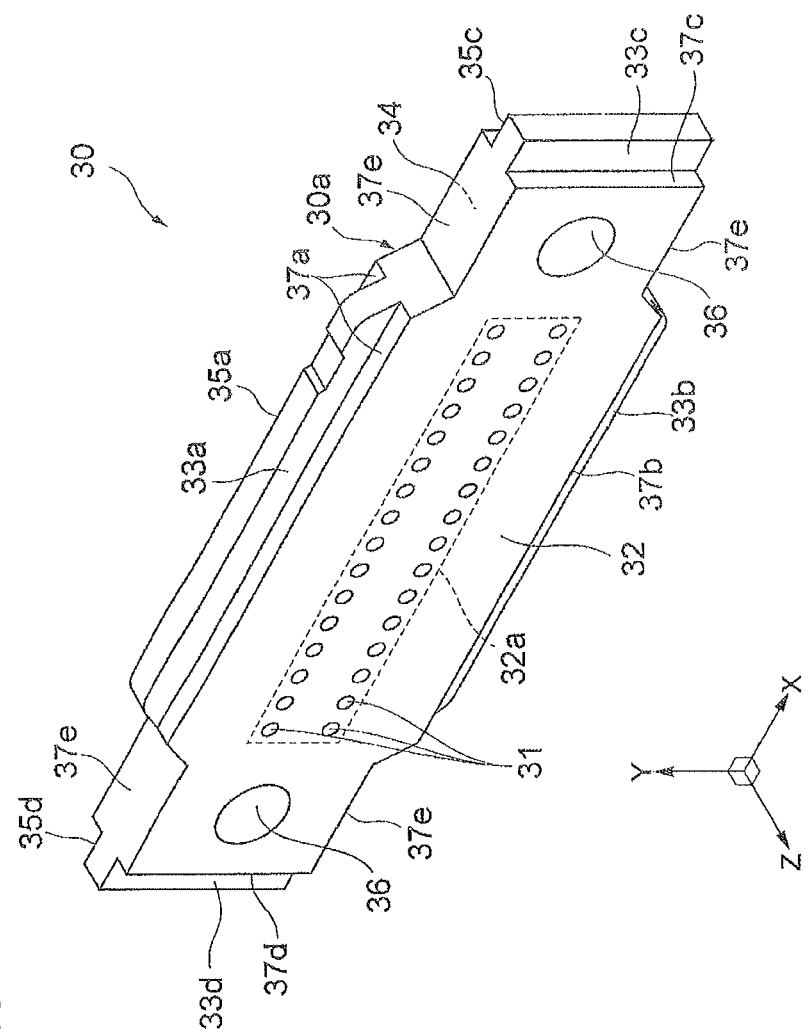
FIG. 6 is a perspective view of the GRIN lens array viewed from its oblique front.
Figure 7:
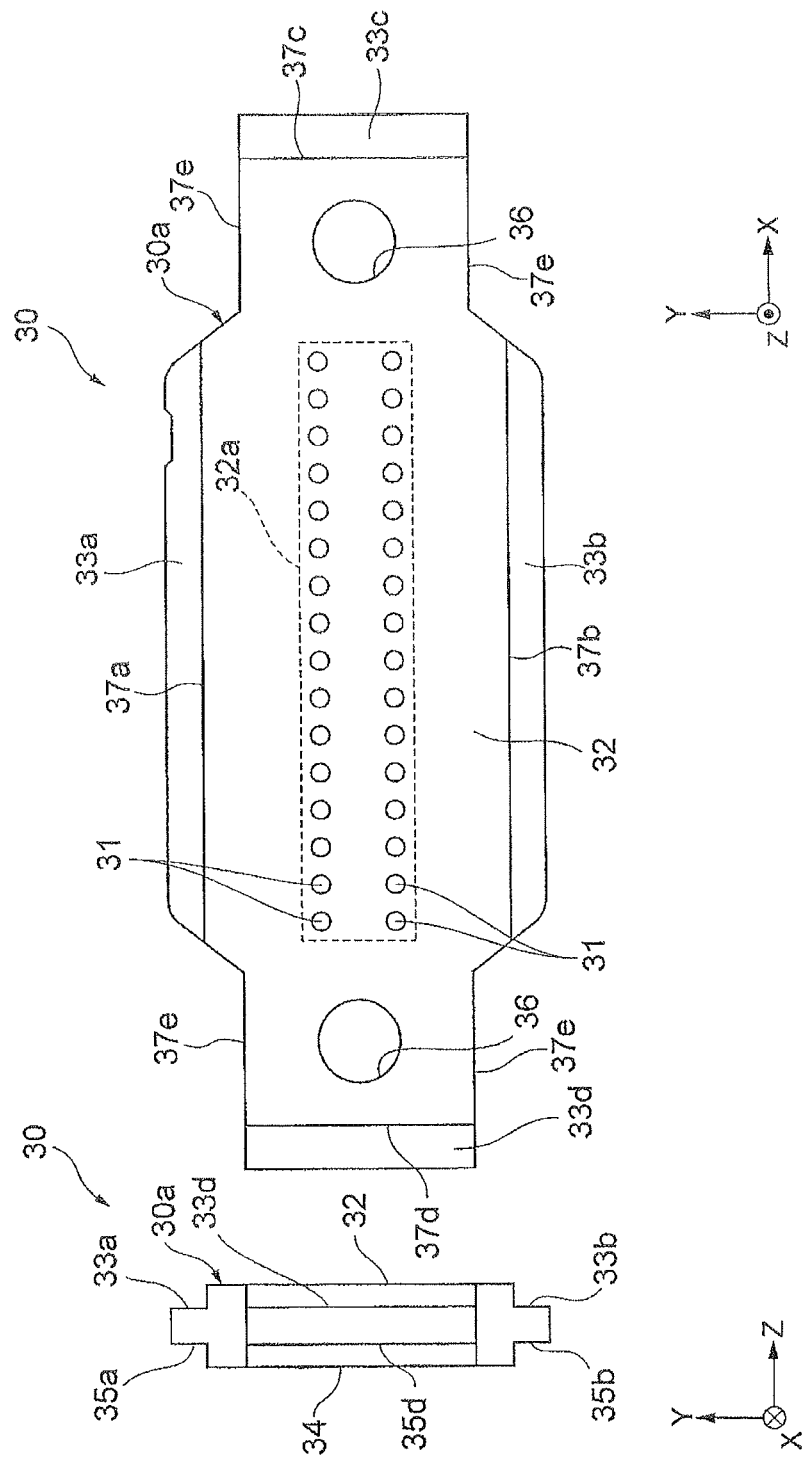
FIG. 7A and FIG. 7B are a front view and a side view, respectively, of the GRIN lens array.

FIG. 6 is a perspective view of the GRIN lens array 30 from its oblique front. FIG. 7A and FIG. 7B are a front view and a side view, respectively, of the GRIN lens array 30. As described above, the GRIN lens array 30 has a plurality of GRIN lenses 31. The plurality of GRIN lenses 31 are optically coupled to the corresponding optical fibers 61 held by the ferrule 20. The plurality of GRIN lenses 31 have their respective optical axes along the Z-direction and are arranged in juxtaposition in the X-direction and in the Y-direction. In the example shown in FIG. 6, the GRIN lenses 31 are constituted of two Y-directionally-juxtaposed rows each of which consists of eighteen X-directionally-arranged GRIN lenses 31 (36 lenses in total), corresponding to the plurality of fiber holding holes 22 (cf. FIG. 5).

As shown in FIGS. 6, 7A, and 7B, the GRIN lens array 30 has a main body portion 30a. The main body portion 30a is of an approximate plate shape extending along the X-Y plane and is composed of a holding portion holding the plurality of GRIN lenses 31, and edge portions provided on side faces of the holding portion. Namely, the main body portion 30a has a first face 32 as its front end face (face corresponding to a first coupling face of the holding portion), second faces 33a-33d as front-end-side reference faces (faces corresponding to first reference faces of the edge portions), a third face 34 as its rear end face (face corresponding to a second coupling face of the holding portion), and fourth faces 35a-35d as rear-end-side reference faces (faces corresponding to second reference faces of the edge portions). Furthermore, the main body portion 30a has side faces 37a-37d (faces corresponding to side faces of the holding portion) connecting the first face 32 and the third face 34 along the Z-direction. The first face 32 and the third face 34 are opposed in the Z-direction and the second faces 33a-33d are opposed to the fourth faces 35a-35d, respectively, in the Z-direction. The second face 33a and the fourth face 35a are formed in a portion projecting from the side face 37a. Similarly, the second faces 33b-33d and the fourth faces 35b-35d are formed in portions projecting from the side faces 37b-37d, respectively. It is preferred to define the X-directional and Y-directional lengths of the GRIN lens array 30 so as not to protrude from the front end face 20a of the ferrule 20 when viewed from the Z-direction.

The first face 32 includes a first interface region 32a. The first interface region 32a is a flat region on the first face 32, which extends along a first plane (e.g., the X-Y plane) intersecting with the Z-direction, and one end faces of the GRIN lenses are exposed therein. In this configuration, the GRIN lenses 31 are optically connected to the corresponding GRIN lenses of the GRIN lens array 30 of the connection counterpart lens-mounted connector in the adaptor 50A shown in FIGS. 1A and 1B. This connection causes the GRIN lenses 31 of the respective lens-mounted connectors 10A, 10B to be coupled to each other. In the present embodiment, the respective first interface regions 32a of the lens-mounted connectors 10A, 10B are brought into contact with each other. As described previously, the front-end-side portions of the pair of guide pin holes 36 as the first guide portion are formed in the first face 32. The pair of guide pin holes 36 are formed in juxtaposition in the X-direction. Furthermore, the first interface region 32a is disposed between the pair of guide pin holes 36.

The second faces 33a-33d are flat faces which are used as reference in an operation of polishing the first face 32, which are approximately parallel to the first face 32, and which face in the same direction (forward) as the first face 32. The second faces 33a-33d are formed at a position different from that of the first face 32 in the Z-direction (e.g., at a position behind the first face 32) and are formed at respective positions different from that of the first face 32 in the X-direction or the Y-direction intersecting with the Z-direction. In the present embodiment, the second faces 33a, 33b are provided at the respective positions different from that of the first face 32 and on both sides of the first face 32 in the Y-axis direction, and the second faces 33c, 33d are provided at the respective positions different from that of the first face 32 and on both sides of the first face 32 in the X-axis direction. Namely, the second faces 33a-33d are provided outside the outer edge of the first face 32, between the first face 32 and the third face 34.

Figure 8:
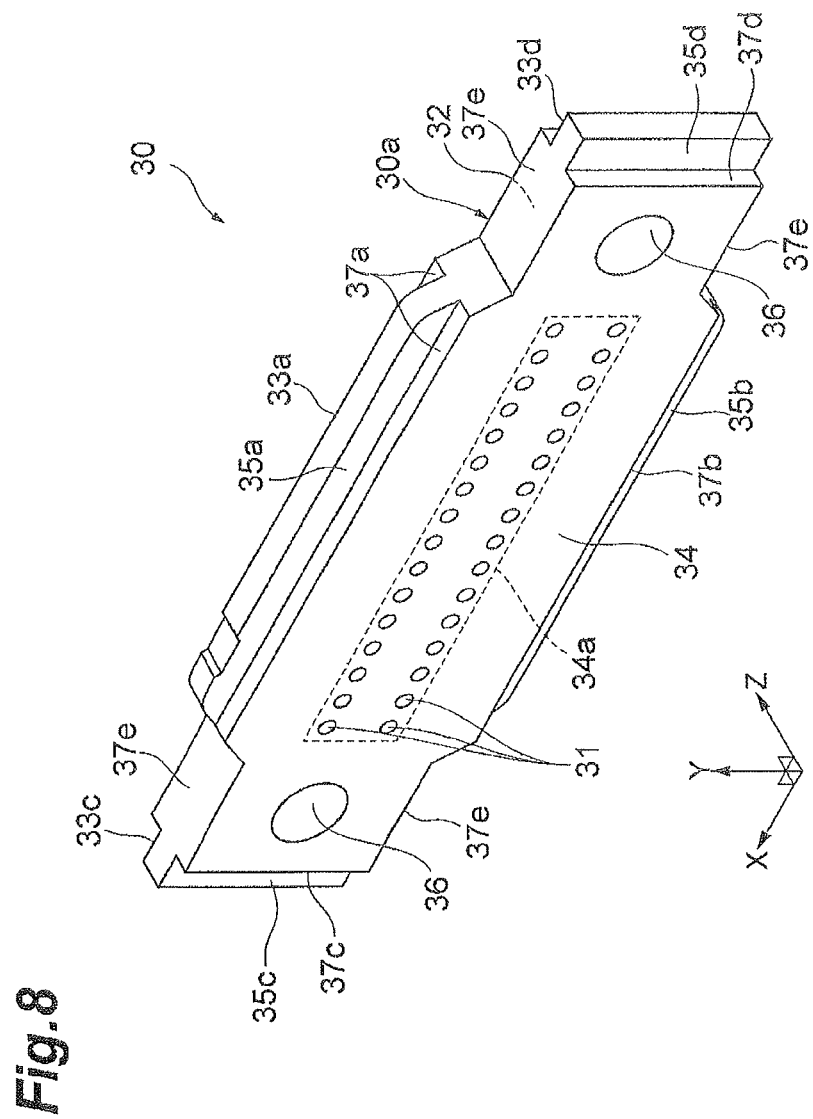
FIG. 8 is a perspective view of the GRIN lens array viewed from its oblique back.
Figure 9:
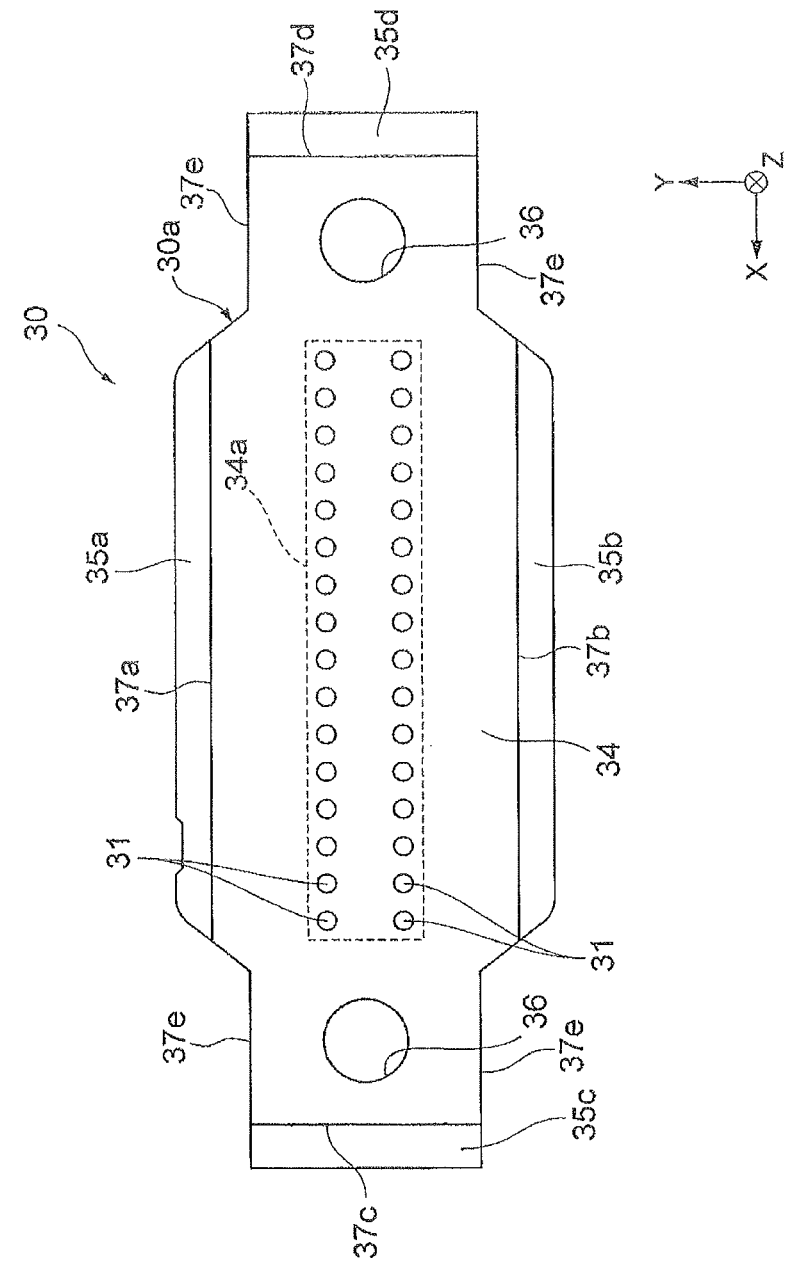
FIG. 9 is a back view of the GRIN lens array.

FIG. 8 is a perspective view of the GRIN lens array 30 from its oblique back. FIG. 9 is a back view of the GRIN lens array 30. As shown in FIGS. 8 and 9, the third face 34 includes a second interface region 34a. The second interface region 34a is a flat region on the third face 34, which extends along a second plane intersecting with the Z-direction, and the other end faces of the GRIN lenses are exposed therein. In this configuration, the GRIN lenses 31 are optically connected to the corresponding optical fibers located in the front end face 20a of the ferrule 20. This connection causes the GRIN lenses 31 of the GRIN lens array 30 to be optically coupled to the end faces of the corresponding optical fibers 61. The second plane is, for example, a face parallel to the aforementioned first plane (e.g., the X-Y plane). In that case, the first face 32, second faces 33a-33d, third face 34, and fourth faces 35a-35d are approximately parallel to each other. Alternatively, the second plane may be a face inclined relative to the first plane.

The third face 34 is arranged approximately in parallel to the front end face 20a of the ferrule 20 and is opposed to the front end face 20a. The third face 34 and the front end face 20a of the ferrule 20 are fixed to each other with an adhesive. As described previously, the rear-end-side portions of the pair of guide pin holes 36 as the second guide portion are formed in the third face 34. In the present embodiment, the guide pin holes 36 penetrate from the first face 32 to the third face 34. In other words, the first guide portion and the second guide portion are comprised of common through holes penetrating in the Z-direction between the first face 32 and the third face 34.

The fourth faces 35a-35d are flat faces which are used as reference in an operation of polishing the third face 34, which are approximately parallel to the third face 34, and which face in the same direction (backward) as the third face 34. The fourth faces 35a-35d are formed at a position different from that of the third face 34 in the Z-direction (e.g., at a position ahead the third face 34) and are formed at respective positions different from that of the third face 34 in the X-direction or the Y-direction intersecting with the Z-direction. In the present embodiment, the fourth faces 35a, 35b are provided at the respective positions different from that of the third face 34 and on both sides of the third face 34 in the Y-axis direction, and the fourth faces 35c, 35d are provided at the respective positions different from that of the third face 34 and on both sides of the third face 34 in the X-axis direction. Namely, the fourth faces 35a-35d are provided outside the outer edge of the third face 34, between the first face 32 and the third face 34. In the Z-direction, the fourth faces 35a-35d are provided closer to the third face 34 than the second faces 33a-33d.

As shown in FIGS. 6 and 8, indentations 37e indented in a direction intersecting with the Z-direction (e.g., in the Y-direction) are formed in the side faces 37a, 37b of the main body portion 30a. The indentations 37e are formed at four locations in total at both ends of the side faces 37a, 37b in the X-direction. In other words, the indentations 37e are formed at the four corners of the main body portion 30a as viewed from the Z-direction. The number of indentations 37e is arbitrary and may be at least one.

The GRIN lens array 30 of the present embodiment can be manufactured, for example, as described below. First, the main body portion 30a is formed by injection molding of a resin. Namely, a mold with inner faces for forming the first face 32, second faces 33a-33d, third face 34, fourth faces 35a-35d, and indentations 37e is assembled and thereafter the resin is injected into the interior of the assembled mold. Then, the resin is hardened and thereafter the main body portion 30a is taken out of the mold. In this state, the plurality of GRIN lenses 31 are not mounted yet and only the plurality of GRIN lens holding holes penetrating between the first face 32 and the third face 34 are formed in the main body portion 30a. Thereafter, the GRIN lenses are inserted one by one into these GRIN lens holding holes and are fixed by adhesion.

Next, the first face 32 and the third face 34 are polished. At this time, the distance between the first face 32 and the third face 34 (i.e., the Z-directional thickness of the main body portion 30a) is adjusted so that each GRIN lens 31 can output the output light from each optical fiber 61 in the form of collimated light and can condense the collimated light received from the Z-direction and couple the condensed light to the corresponding optical fiber 61. In order to couple the optical fibers 61 to the lens-mounted connector of the connection counterpart, the angles of the first face 32 and the third face 34 with respect to the X-Y plane are set to predetermined angles. At this time, the second faces 33a-33d are formed at the angle equal to the predetermined angle of the first face 32 and function as reference faces. The first face 32 is polished so as to be approximately parallel to the second faces 33a-33d. Similarly, the fourth faces 35a-35d are formed at the angle equal to the predetermined angle of the third face 34 and function as reference faces. The third face 34 is polished so as to be approximately parallel to the fourth faces 35a-35d.

Figure 10:
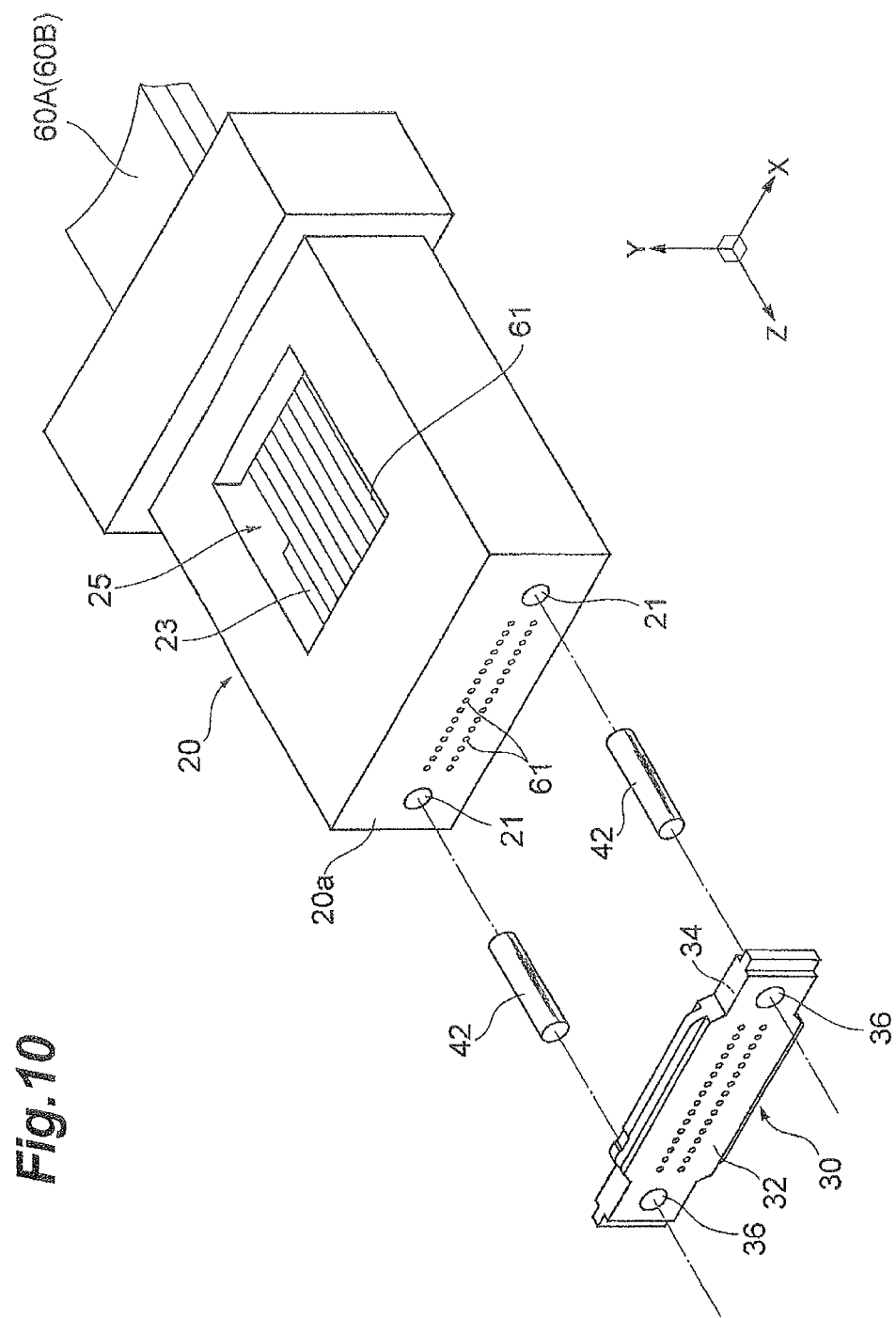
FIG. 10 is a perspective view showing an assembling process of the lens-mounted connector.

FIG. 10 is a perspective view showing an assembling step of the lens-mounted connector 10A (10B). In assembling the lens-mounted connector 10A (10B), the coating is first removed from the vicinity of the tips of the optical fibers 61 and the optical fibers 61 are inserted into the fiber holding holes 22 (cf. FIG. 5) of the ferrule 20. Then an adhesive is introduced through the opening 25 to fix each optical fiber 61 to the ferrule 20. After the adhesive is hardened, the front end face 20a is polished so as to become parallel to the third face 34 of the GRIN lens array 30. The front end face 20a after polished is, for example, perpendicular to the Z-direction.

Subsequently, an adhesive is applied to the third face 34 of the GRIN lens array 30 and to the front end face 20a of the ferrule 20 and the third face 34 and the front end face 20a are bonded to each other. At this time, the jig guide pins 42 are put into the guide pin holes 21, 36, whereby the guide pin holes 21 (third guide portion) and the rear-end-side portions of the guide pin holes 36 (second guide portion) are connected to each other. As the jig guide pins 42 are inserted into the guide pin holes 21, 36, the GRIN lens array 30 and the ferrule 20 are accurately positioned. Thereafter, the jig guide pins 42 are removed, thereby obtaining the lens-mounted connector 10A (10B) in which the ferrule 20 and the GRIN lens array 30 are integrated.

The below will describe effects achieved by the lens-mounted connector system 1A, lens-mounted connector 10A (10B), and GRIN lens array 30 according to the present embodiment, which were described above. On the occasion of producing the GRIN lens array 30 of the present embodiment, it becomes feasible to polish the first interface region 32a, using the second faces 33a-33d as reference faces. Therefore, as long as the second faces 33a-33d are formed with a desired angle, the first interface region 32a can be accurately formed with the desired angle, by polishing the first face 32 in parallel to the second faces 33a-33d. On that occasion, the second faces 33a-33d are formed at the positions different from those of the first face 32 in the Z-direction and in the direction (X-direction or Y-direction) intersecting with the Z-direction. In this case, the polishing operation of the first face 32 is not impeded. Namely, with the GRIN lens array 30 of the present embodiment, we have succeeded in providing the GRIN lens array 30 in which the angular error of the first interface region 32a is suppressed, which has good optical characteristics while keeping the connection loss low to the lens-mounted connector of the connection counterpart, and which is applied to the lens-mounted connector 10A (10B). With the lens-mounted connector 10A (10B) of the present embodiment, the GRIN lens array 30 and the ferrule 20 can be accurately fixed in a predetermined positional relationship, using the guide pin holes 36 (second guide portion) and the guide pin holes 21 (third guide portion). Therefore, the lens-mounted connector 10A (10B) is provided as one with good optical characteristics.

In the present embodiment, the GRIN lens array 30 provided in one lens-mounted connector 10A (or 10B) expands the diameter of each of the beams output from the respective optical fibers of the optical cable 60A (or 60B). The GRIN lens array 30 provided in the other lens-mounted connector 10B (or 10A) receives the expanded beams from the one lens-mounted connector 10A (or 10B), condenses these beams, and injects the beams into the respective optical fibers 61 of the optical cable 60B (or 60A). In this manner, the lens-mounted connector system 1A of the present embodiment is configured to perform the transfer of light in the form of expanded beams, thereby to suppress the connection loss due to misalignment between the lens-mounted connectors 10A, 10B in the plane (X-Y plane) intersecting with the connection direction. Therefore, it provides the optical coupling structure with little degradation of optical characteristics due to the misalignment (or with a large tolerance). Since this structure does not require the guide pins to have high processing accuracy, the lens-mounted connector system 1A with good optical characteristics can be provided at low cost. In an example, the guide pins 40 to be used are guide pins that are usually used in optical connectors for connection of multimode optical fibers. In this case, the difference between the diameter of the guide pins 40 and the inner diameter of the guide pin holes 21, 36 is, for example, larger than 1 µm and not more than 2 µm.

The misalignment between the optical fiber 61 and GRIN lens 31 causes angular deviation of the beam emerging from the GRIN lens 31 or the beam incident into the GRIN lens 31, and thus significantly affects the optical characteristics. Therefore, it is desirable to form the jig guide pins 42 shown in FIG. 10 with higher accuracy than the guide pins 40 for connector coupling shown in FIG. 3. In an example, the jig guide pins 42 to be used are guide pins that are usually used in optical connectors for connection of single-mode optical fibers, in order to enhance positioning accuracy between the GRIN lens array 30 and the ferrule 20. At this time, the difference between the diameter of the jig guide pins 42 and the inside diameter of the guide pin holes 21, 36 is, for example, not more than 1 µm. The diameter of the jig guide pins 42 herein refers to an average of outside diameters in the axial direction if there is variation in outside diameter in the axial direction. This keeps deviation, for example, not more than 1 µm between center positions of the guide pin holes 21 of the ferrule 20 and the guide pin holes 36 of the GRIN lens array 30, whereby the ferrule 20 and the GRIN lens array 30 can be accurately positioned. Even though the jig guide pins 42 to be used are those with high accuracy as described above, they can be reused for manufacture of other lens-mounted connectors 10A (10B), after manufacture of the lens-mounted connector 10A (10B), and thus it is possible to reduce manufacturing cost.

When the size of the main body portion 30a holding the GRIN lenses 31 (particularly, the thickness in the optical-axis direction) is small, it is also difficult to accurately polish the third face 34 opposed to the ferrule 20, at a desired angle. If there is an angular error of the third face 34, the optical axis of each GRIN lens 31 will become inclined relative to the optical axis of each optical fiber 61, raising a possibility of occurrence of connection loss. In contrast to it, the GRIN lens array 30 of the present embodiment enables the third face 34 to be polished using the fourth faces 35a-35d as reference faces. Therefore, as long as the fourth faces 35a-35d are formed with the desired angle to the Z-direction or connection direction, the second interface region 34a can be accurately formed with the desired angle, by polishing the third face 34 so as to become parallel to the fourth faces 35a-35d. On that occasion, the polishing operation of the third face 34 is not impeded because the fourth faces 35a-35d are formed at the position different from that of the third face 34 in the Z-direction. Namely, the GRIN lens array 30 of the present embodiment is made while well suppressing the angular error of the second interface region 34a and thus further reducing the optical loss. For example, even in a situation where the third face 34 and the first face 32 are not parallel to each other, the first interface region 32a and the second interface region 34a both can be accurately formed.

In the present embodiment the first face 32 and the third face 34 may be inclined relative to each other, but the first face 32 and the third face 34 may be approximately parallel to each other. In this case, the first face 32, second faces 33a-33d, and third face 34 are approximately parallel to each other, and the third face 34 can be polished using the second faces 33a-33d as reference faces. Even in such a case, the second interface region 34a can also be accurately formed so as to have a desired angle. The angular error of the second interface region 34a is suppressed, so as to enable further reduction in optical loss. In that case, the fourth faces 35a-35d do not have to be approximately parallel to the third face 34. In this case, the both sides of the GRIN lens array 30 (the sides where the two lens end faces of each GRIN lens 31 are located) are the polished faces of the same angle and thus the first face 32 and the third face 34 can be polished in the same direction (direction along the second faces 33a-33d), which facilitates the polishing step and, in turn, the manufacture of the GRIN lens array.

Furthermore, as in the present embodiment, the first guide portion and second guide portion may be composed of the common through holes (guide pin holes 36) penetrating in the Z-direction between the first face 32 and the third face 34. This configuration allows the lens-mounted connector of the connection counterpart, the GRIN lens array 30, and the ferrule 20 to be connected in the Z-direction with use of the common guide pins 40, which can readily improve positioning accuracy.

As in the present embodiment, the GRIN lens array 30 may further have the side faces 37a, 37b which connect the first face 32 and the third face 34 along the Z-direction and at least one indentation 37e indented in the direction intersecting with the Z-direction may be formed in the side faces 37a, 37b. For example, when the GRIN lens array 30 is formed by injection molding of a resin, a mold is provided with a gate for injection of the resin at a position on these side faces 37a, 37b. After completion of molding, a burr remains at the position of the gate and this burr may impede the polishing operation. For this reason, it is necessary to perform a step of removing the burr. In contrast to it, the GRIN lens array 30 of the present embodiment allows the gate of the mold to be located at the indentation 37e, whereby the polishing operation becomes less likely to be impeded by the burr. Therefore, the burr of a certain size can be left as it is, and thus it does not require the step of removing the burr. Therefore, the GRIN lens array 30 of the present embodiment achieves decrease of manufacturing step and thus enables reduction in manufacturing cost.

As in the present embodiment, two or more indentations 37e may be formed in the side faces 37a, 37b. When the main body portion 30a is formed by injection molding of a resin, the main body potion 30a needs to be pushed out, in order to take the main body portion 30a out of the mold after the injection molding. At this time, the pushing operation of the main body portion 30a is performed using a member called an ejector pin, and a mark of the pin can be left at a portion of the GRIN lens array 30 in contact with the ejector pin. Therefore, it becomes necessary to perform a step of removing the mark. In contrast to it, the foregoing GRIN lens array 30 allows the contact portion with the ejector pin to be located at the indentation 37e different from the indentation 37e where the aforementioned gate is provided, whereby the step of removing the mark becomes unnecessary. Therefore, this GRIN lens array 30 achieves further decrease of manufacturing step and thus enables further reduction in manufacturing cost. The indentation 37e which is brought into contact with the ejector pin is more preferably located at a position where it is opposed to the indentation 37e where the gate is located. This allows the main body portion 30a to be taken out in a charging direction of the resin, after the resin is charged, and it can increase manufacturing efficiency.

In the present embodiment, the pair of indentations 37e are formed at the two ends of the side face 37a when viewed from the Z-direction and the pair of indentations 37e are formed at the two ends of the side face 37b when viewed from the Z-direction. In this case, it is preferred to locate the gates of the mold at the respective indentations 37e of the side face 37a. By this setup, the resin is uniformly charged into the whole main body portion 30a and, as a result, it can avoid a problem that the main body portion 30a becomes warped by residual stress after the molding. It is preferred to locate the contact portions with the ejector pins at the respective indentations 37e of the side face 37b opposed to these gate positions. As the indentations 37e where the gates are to be located and the indentations 37e to be brought into contact with the ejector pins are provided so as to be opposed to each other and formed at the two ends of each side face when viewed from the Z-direction, the main body portion 30a comes to have the shape with good symmetry as a whole. It can avoid the problem of warpage of the main body portion 30a during hardening after charging the resin into the mold.

(First Modification Example)

Figure 11:
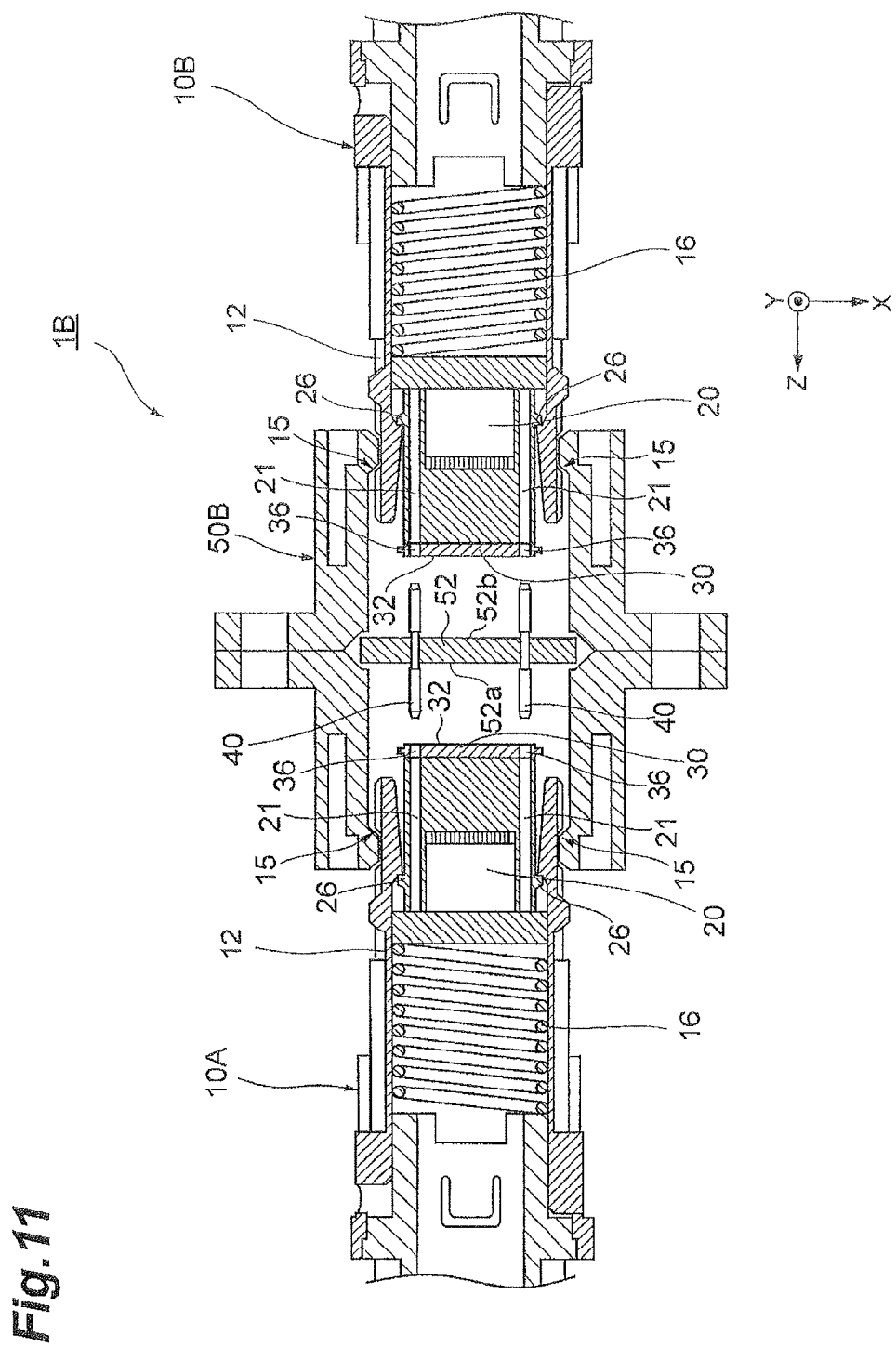
FIG. 11 is a cross-sectional view showing an internal structure of a lens-mounted connector system (internal structure along the X-Z plane including the line I-I in FIG. 3) according to a first modification example.

FIG. 11 is a cross-sectional view showing a configuration of a lens-mounted connector system 1B according to the first modification example of the above embodiment, while showing a cross section along the X-Z plane. The lens-mounted connector system 1B of the present modification example is different in the configuration of the adaptor 50B and the arrangement of the guide pins 40 from the above embodiment. Namely, the adaptor 50B of the lens-mounted connector system 1B of the present modification example further has a spacer 52, in addition to the configuration of the adaptor 50A in the above embodiment. The spacer 52 is a plate-like member arranged in an approximately central region of the adaptor 50B, and extends along the X-Y plane. The Z-direction coincides with the thickness direction of the spacer 52. One face 52a (first contact face) of the spacer 52 is opposed to the first face 32 of the GRIN lens array 30 of the lens-mounted connector 10A, while the other face 52b (second contact face) is opposed to the first face 32 of the GRIN lens array 30 of the lens-mounted connector 10B. In an example, the spacer 52 is arranged with the faces 52a, 52b in contact with the respective first faces 32 of the lens-mounted connectors 10A, 10B, respectively, so as to separate the two GRIN lens arrays 30 from each other. This arrangement causes the first interface regions 32a (cf. FIGS. 6, 7A, and 7B) of the respective lens-mounted connectors 10A, 10B to be opposed with a space to each other. The spacer 52 has paths which form optical paths for optically connecting the GRIN lenses 31 in the respective first interface regions 32a to each other. This configuration enables optical connection in a state in which the space is placed between the front end faces (first faces 32), while the Z-directional load is applied to each ferrule 20 and GRIN lens array 30 by the helical compression spring 16 (cf. FIG. 2).

The spacer 52 holds the pair of guide pins 40. The pair of guide pins 40 are arranged at positions corresponding to the guide pin holes 36 of the two lens-mounted connectors 10A, 10B. This setup eliminates the need for attaching the guide pins 40 to either of the lens-mounted connectors 10A, 10B and thus the lens-mounted connectors 10A, 10B can be formed completely in the same configuration, thus facilitating management of each lens-mounted connector 10A, 10B.

(Second Modification Example)

Figure 12:
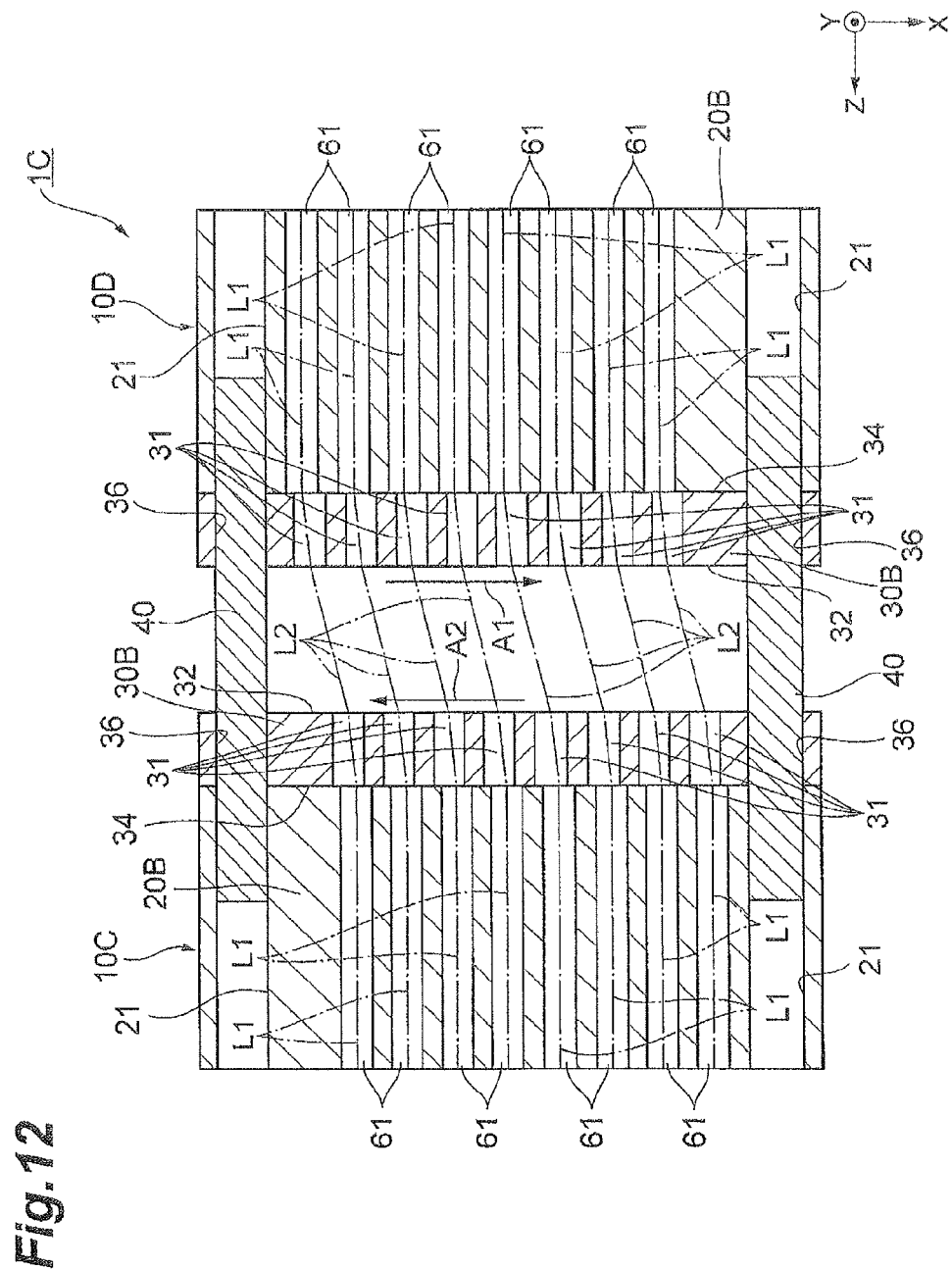
FIG. 12 is a cross-sectional view showing an internal structure of a lens-mounted connector system (internal structure along the X-Z plane including the line I-I in FIG. 3) according to a second modification example.

FIG. 12 is a cross-sectional view showing a schematic configuration of a lens-mounted connector system 1C according to the second modification example of the above embodiment, while showing only GRIN lens arrays 30B and ferrules 20B of lens-mounted connectors 10C, 10D. The present modification example is different in the relative positional relationship of the GRIN lenses 31 and the optical fibers 61 from the above embodiment. Namely, in the present modification example, the positions of the respective optical axes of the GRIN lenses 31 in the first face 32 are deviated in a direction along the X-Y plane (first plane), with respect to the respective axes of the optical fibers 61. As an example, in the configuration shown in FIG. 12, the respective optical axes of the GRIN lenses 31 of the lens-mounted connector 10C are slightly deviated in a certain direction (arrow A2 in the drawing) along the X-direction with respect to the respective optical axes L1 of the optical fibers 61, and the respective optical axes of the GRIN lenses 31 of the lens-mounted connector 10D are slightly deviated in the opposite direction (arrow A1 in the drawing) along the X-direction with respect to the respective optical axes L1 of the optical fibers 61. The GRIN lens arrays 30B of the respective lens-mounted connectors 10C, 10D are opposed with a space in between by a spacer not shown (e.g., the spacer 52 in the first modification example).

In the above configuration, the optical axes L2 between the GRIN lenses 31 of the lens-mounted connector 10C and the GRIN lenses 31 of the lens-mounted connector 10D are inclined relative to the optical axes L1. Namely, the optical axes are bent in the X-direction, at the interface between the optical fibers 61 and GRIN lenses 31 of one lens-mounted connector 10C (or 10D). Furthermore, the optical axes are further bent in the X-direction at the front end faces of the GRIN lenses 31. In the other lens-mounted connector 10D (or 10C), the GRIN lenses 31 are arranged at respective positions where they can receive the optical axes. The beams incident into the respective GRIN lenses 31 are bent in the opposite direction to the above to reach the corresponding optical fibers 61.

The foregoing configuration can prevent reflected light generated on the front end faces of the GRIN lenses 31 (first interface region 32a) in the state in which the lens-mounted connectors 10C, 10D are opposed with the space to each other, from being re-coupled to the optical fibers 61. Therefore, the lens-mounted connectors can be provided as those with good optical characteristics.

Here, FIG. 13A is a front view obtained by viewing the first face 32 of the GRIN lens array 30B in the second modification example of FIG. 12 from its front, and FIG. 13B a front view obtained by viewing the front end face 20a of the ferrule 20B in the second modification example of FIG. 12 from its front. In the GRIN lens array 30B, as shown in FIG. 13A, a center position P2 in the X-direction of the lens group consisting of the plurality of GRIN lenses 31 is deviated by a distance d1 in the direction opposite to the deviation direction of the optical axes of the respective GRIN lenses 31 (arrow A1 or A2; in other words, the bending direction of the optical axes), with respect to a center position P1 in the X-direction between the pair of guide pin holes 36. Furthermore, in the ferrule 20B, as shown in FIG. 13B, a center position P3 in the X-direction of the fiber group consisting of the optical fibers 61 are deviated by a distance d2 (>d1) in the direction opposite to the deviation direction of the optical axes of the respective GRIN lenses 31, with respect to the center position in the X-direction between the pair of guide pin holes 21 (i.e., the foregoing center position P1). The arrangement of the plurality of GRIN lenses 31 is line-symmetric with respect to the center position P2, and the arrangement of the plurality of optical fibers 61 is line-symmetric with respect to the center position P3. The positional relation of the pair of guide pin holes 36 is 180° rotational symmetry around a certain reference axis C1 along the Z-axis (e.g., the central axis of the GRIN lens array 30).

This configuration allows the center axis of one lens-mounted connector 10C and the center axis of the other lens-mounted connector 10D to coincide with each other and allows these lens-mounted connectors 10C, 10D to be connected to each other, with the other lens-mounted connector 10D being inverted vertically. Namely, in the case of the lens-mounted connectors of the present modification example, even though the optical axes L2 between the GRIN lens arrays 30B are inclined, the lens-mounted connectors 10C, 10D can be formed in the same shape and thus the manufacturing cost can be reduced by forming the lens-mounted connectors in the common structure.

The present modification example exemplified the case where the arrangements of the GRIN lenses 31 and optical fibers 61 were deviated in the X-direction, but the arrangements of the GRIN lenses 31 and optical fibers 61 may be deviated in another direction in the X-Y plane, e.g., in the Y-direction. In such a case, the aforementioned effects of the present modification example can also be suitably achieved.

The GRIN lens arrays, lens-mounted connectors, and lens-mounted connector systems according to the present invention are by no means intended to be limited only to the above-described embodiment and examples but may be modified in many ways. For example, in the above embodiment each set of the second faces and the fourth faces are formed as four faces, but each of the second faces and the fourth faces may consist of at least one face or more. The first to third guide portions are not limited to the guide pin holes as in the aforementioned embodiment, but may be grooves extending in the connection direction, for example, which are formed in the side faces of the GRIN lens array and the ferrule. In that case, for example, the grooves are made to be set along projections provided on the inner surface of the adaptor so as to extend in the connection direction, whereby the lens-mounted connectors can be accurately connected to each other. Furthermore, the first connection target component in the present invention is not limited only to the lens-mounted connector, but can be any one of optical connectors in various forms. The second connection target component in the present invention is not limited only to the ferrule, but can be any one of optical components in various forms. In the above embodiment the end faces of the GRIN lenses all are exposed in the first face and in the third face, but it is sufficient that the end face of at least one GRIN lens be exposed in the first face and in the third face.

In the case of the GRIN lens array, lens-mounted connector, and lens-mounted connector system according to the embodiment of the invention, as described above, the front end face of the member holding the GRIN lenses (the first coupling face of the holding portion constituting a part of the main body portion) can be accurately polished so as to have the desired angle relative to the optical axes of the GRIN lenses.

What is claimed is:

1. A GRIN lens array comprising:
 a plurality of GRIN lenses each of which has a first lens end face and a second lens end face opposed to the first lens end face; and
 a main body portion which holds the plurality of GRIN lenses in a state in which the first and second lens end faces of each of the GRIN lenses are arranged along a first direction,
 wherein the main body portion comprises:
 a holding portion having a first coupling face in which the first lens end faces of the GRIN lenses are arranged, and a second coupling face which is opposed to the first coupling face and in which the second lens end faces of the GRIN lenses are arranged, and
 an edge portion provided on a side face of the holding portion between the first and second coupling faces, the edge portion having a first reference face located on the side where the first lens end faces of the GRIN lenses are arranged, and a second reference face opposed to the first reference face and located on the side where the second lens end faces of the GRIN lenses are arranged,
 wherein a distance between the first and second coupling faces along the first direction is larger than a distance between the first and second reference faces along the first direction,
 wherein the holding portion further comprises a side face which connects the first coupling face and the second coupling face along the first direction, and
 wherein one or more indentations indented in a second direction intersecting with the first direction are formed in the side face.

2. The GRIN lens array according to claim 1, wherein the second coupling face of the holding portion and the second reference face of the edge portion are arranged on an identical plane.

3. A GRIN lens array comprising:
 a plurality of GRIN lenses each of which has a first lens end face and a second lens end face opposed to the first lens end face; and
 a main body portion which holds the plurality of GRIN lenses in a state in which the first and second lens end faces of each lens are arranged along a first direction, the main body portion having a first end portion and a second end portion arranged at respective different positions along the first direction,
 wherein the first end portion comprises a first face and a second face arranged at respective different positions along the first direction,
 wherein the first face includes:
 a first interface region in which the first lens end faces of the respective GRIN lenses are exposed; and
 a first guide portion which defines a position of the first interface region on a first plane intersecting with the first direction, and
 wherein the second face is substantially parallel to the first face, and is arranged at a position where a shortest distance from the second end portion to the second face along the first direction is smaller than a shortest distance from the second end portion to the first face along the first direction, and at a position different from that of the first face along a second direction intersecting with the first direction, and
 wherein the second end portion comprises a third face and a fourth face arranged at respective different positions along the first direction,
 wherein the third face includes:
 a second interface region where the second lens end faces of the respective GRIN lenses are exposed; and
 a second guide portion which defines a position of the second interface region on a second plane intersecting with the first direction, and wherein the fourth face is substantially parallel to the third face, and is arranged at a position where a shortest distance from the first end portion to the fourth face along the first direction is smaller than a shortest distance from the first end portion to the third face along the first direction, and at a position different from that of the third face along a third direction intersecting with the first direction.

4. The GRIN lens array according to claim 3, wherein the first guide portion includes one opening end of a common through hole penetrating along the first direction between the first face and the third face, and wherein the second guide portion includes the other opening end of the common through hole.

5. The GRIN lens array according to claim 3, wherein the main body portion further comprises a side face which connects the first face and the third face along the first direction, and
wherein one or more indentations indented in a fourth direction intersecting with the first direction are formed in the side face.

6. The GRIN lens array according to claim 5, wherein the second end portion comprises a third face opposed to the first face,
wherein the third face includes:
a second interface region where the other end faces of the respective GRIN lenses are exposed; and
a second guide portion which defines a position of the second interface region on a second plane intersecting with the first direction, and
wherein the first face, the second face, and the third face are substantially parallel to each other.

7. The GRIN lens array according to claim 6, wherein the first guide portion includes one opening end of a common through hole penetrating along the first direction between the first face and the third face, and wherein the second guide portion includes the other opening end of the common through hole.

8. The GRIN lens array according to claim 6, wherein the main body portion further comprises a side face which connects the first face and the third face along the first direction, and
wherein one or more indentations indented in a fourth direction intersecting with the first direction are formed in the side face.

9. A lens-mounted connector comprising:
the GRIN lens array as set forth in claim 3; and
a connection component including a plurality of optical fibers optically connected in a one-to-one relation to the respective GRIN lenses and a ferrule holding tip portions of the optical fibers,
wherein the ferrule comprises:
a third guide portion connected to the second guide portion;
a ferrule end face substantially parallel to the third face; and
a plurality of fiber holding holes each of which extends along the first direction from the ferrule end face so as to hold the corresponding GRIN lens out of the plurality of GRIN lenses,
wherein the plurality of optical fibers are held in the respective fiber holding holes in a state in which the fiber end faces of the respective optical fibers are exposed in the ferrule end face, and
wherein the ferrule is fixed to the GRIN lens array in a state in which the ferrule end face and the third face are opposed.

10. The lens-mounted connector according to claim 9, wherein when the first face is viewed from a direction directed from the first face to the third face, positions of optical axes of the respective GRIN lenses on the first face are deviated in a predetermined deviation direction, with respect to positions of optical axes of the respective optical fibers.

11. The lens-mounted connector according to claim 10, wherein the first face includes another first guide portion arranged with the first interface region in between the first guide portions, and
wherein on the first face, a center position of the first interface region is deviated in a fifth direction opposite to the deviation direction from a center position between the pair of first guide portions.

12. A lens-mounted connector system comprising:
a first lens-mounted connector having the same structure as the lens-mounted connector as set forth in claim 9;
a second lens-mounted connector having the same structure as the lens-mounted connector as set forth in claim 9;
an adaptor which holds the first and second lens-mounted connectors in a state in which the first faces in the respective first and second lens-mounted connectors are opposed to each other; and
a connection member which connects the first guide portions in the respective first and second lens-mounted connectors to each other, thereby to position the first and second lens-mounted connectors relative to each other so that the GRIN lenses in the first and second lens-mounted connectors are optically coupled to each other.

13. A lens-mounted connector comprising:
a GRIN lens array; and
a connection component including a plurality of optical fibers optically connected in a one-to-one relation to the respective GRIN lenses and a ferrule holding tip portions of the optical fibers,
wherein the GRIN lens array comprises:
a plurality of GRIN lenses each of which has a first lens end face and a second lens end face opposed to the first lens end face; and
a main body portion which holds the plurality of GRIN lenses in a state in which the first and second lens end faces of each lens are arranged along a first direction, the main body portion having a first end portion and a second end portion arranged at respective different positions along the first direction,
wherein the first end portion comprises a first face and a second face arranged at respective different positions along the first direction,
wherein the first face includes:
a first interface region in which the first lens end faces of the respective GRIN lenses are exposed; and
a first guide portion which defines a position of the first interface region on a first plane intersecting with the first direction,
wherein the second face is substantially parallel to the first face, and is arranged at a position where a shortest distance from the second end portion to the second face along the first direction is smaller than a shortest distance from the second end portion to the first face along the first direction, and at a position different from that of the first face along a second direction inserting with the first direction,
wherein the second end portion comprises a third face opposed to the first face, wherein the third face includes:
a second interface region where the other end faces of the respective GRIN lenses are exposed; and
a second guide portion which defines a position of the second interface region on a second plane intersecting with the first direction, and
wherein the first face, the second face, and the third face are substantially parallel to each other,
wherein the ferrule comprises:
a third guide portion connected to the second guide portion;
a ferrule end face substantially parallel to the third face; and
a plurality of fiber holding holes each of which extends along the first direction from the ferrule end face so as to hold the corresponding GRIN lens out of the plurality of GRIN lenses,
wherein the plurality of optical fibers are held in the respective fiber holding holes in a state in which fiber end faces of the respective optical fibers are exposed in the ferrule end face, and
wherein the ferrule is fixed to the GRIN lens array in a state in which the ferrule end face and the third face are opposed.

14. The lens-mounted connector according to claim 13, wherein when the first face is viewed from a direction directed from the first face to the third face, positions of optical axes of the respective GRIN lenses on the first face are deviated in a predetermined deviation direction, with respect to positions of optical axes of the respective optical fibers.

15. The lens-mounted connector according to claim 14, wherein the first face includes another first guide portion arranged with the first interface region in between the first guide portions, and
wherein on the first face, a center position of the first interface region is deviated in a fifth direction opposite to the deviation direction from a center position between the pair of first guide portions.

16. A lens-mounted connector system comprising:
a first lens-mounted connector having the same structure as the lens-mounted connector as set forth in claim 13;
a second lens-mounted connector having the same structure as the lens-mounted connector as set forth in claim 13;
an adaptor which holds the first and second lens-mounted connectors in a state in which the first faces in the respective first and second lens-mounted connectors are opposed to each other; and
a connection member which connects the first guide portions in the respective first and second lens-mounted connectors to each other, thereby to position the first and second lens-mounted connectors relative to each other so that the GRIN lenses in the first and second lens-mounted connectors are optically coupled to each other.

* * * * *